(12) United States Patent
Sugimoto

(10) Patent No.: US 9,380,179 B2
(45) Date of Patent: Jun. 28, 2016

(54) AR DISPLAY DEVICE IN WHICH AN IMAGE IS OVERLAPPED WITH A REALITY SPACE, AR DISPLAY CONTROL DEVICE, PRINT CONDITION SETTING SYSTEM, PRINT SYSTEM, PRINT SETTING DISPLAY METHOD, AND NON-TRANSITORY COMPUTER-READABLE RECORDING MEDIUM

(71) Applicant: Konica Minolta, Inc., Chiyoda-ku (JP)

(72) Inventor: Yasuaki Sugimoto, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/533,197

(22) Filed: Nov. 5, 2014

(65) Prior Publication Data

US 2015/0138595 A1 May 21, 2015

(30) Foreign Application Priority Data

Nov. 18, 2013 (JP) .................................. 2013-238312

(51) Int. Cl.
*G09G 5/00* (2006.01)
*G06F 3/12* (2006.01)
(Continued)

(52) U.S. Cl.
CPC .......... *H04N 1/0044* (2013.01); *G06K 9/00671* (2013.01); *G06K 15/002* (2013.01);
(Continued)

(58) Field of Classification Search
CPC ... H04N 1/387; H04N 1/444; H04N 1/32101; H04N 2201/0075; H04N 2201/0094; H04N 2201/0414; H04N 2201/3226; H04N 2201/3245; H04N 2007/145; H04N 1/004; H04N 1/00286; H04N 1/00408; H04N 1/00962; G03G 21/00; G06F 3/12–3/14; G06F 3/012; G06F 3/013; H02B 2027/0138; H02B 2027/014; H02B 2027/0178; H02B 2027/087; G02B 27/017; G06K 9/00248; G06K 9/00671; G06K 15/002; G06T 15/00; G06T 11/60; G06T 19/006
USPC ............. 358/1.14, 1.15; 345/8, 156, 419, 633
See application file for complete search history.

(56) References Cited

U.S. PATENT DOCUMENTS

2009/0273687 A1* 11/2009 Tsukizawa ............... G06F 3/013
 348/222.1
2011/0254972 A1* 10/2011 Yaguchi ..................... 348/222.1

(Continued)

FOREIGN PATENT DOCUMENTS

JP 2004072685 A 3/2004
JP 2007200298 A 8/2007

(Continued)

OTHER PUBLICATIONS

English Machine Translation of JP 2013-057830-A (Kaname, Published Mar. 28, 2013).*

(Continued)

*Primary Examiner* — Benny Q Tieu
*Assistant Examiner* — Juan M Guillermety
(74) *Attorney, Agent, or Firm* — Buchanan Ingersoll & Rooney PC

(57) ABSTRACT

Disclosed is an AR display device including: a display unit configured to display an augmented reality space in which an image is overlapped with a reality space; a camera configured to shoot the reality space corresponding to the augmented reality space; a setting information obtaining unit configured to obtain setting contents relating to an additional processing to be carried out for an image or an output sheet; a detecting unit configured to detect a sheet in the reality space and a posture thereof; and a display control unit configured to prepare an output image which simulatedly shows a processing result to be obtained in accordance with the setting contents and which is corrected so as to be matched with the posture of the sheet, and to instruct the display unit to display the augmented reality space in which the output image is overlapped with the sheet.

22 Claims, 26 Drawing Sheets

(51) Int. Cl.
*H04N 1/00* (2006.01)
*G06T 19/00* (2011.01)
*G06K 15/00* (2006.01)
*G06K 9/00* (2006.01)

(52) U.S. Cl.
CPC .......... *G06T19/006* (2013.01); *H04N 1/00286* (2013.01); *H04N 1/00408* (2013.01); *H04N 1/00962* (2013.01); *G06K 9/00604* (2013.01); *G06T 2207/30201* (2013.01); *H04N 2201/0094* (2013.01)

(56) References Cited

U.S. PATENT DOCUMENTS

| | | | |
|---|---|---|---|
| 2012/0064204 A1* | 3/2012 | Davila et al. | 358/1.14 |
| 2012/0223968 A1 | 9/2012 | Kashimoto | |
| 2013/0027757 A1* | 1/2013 | Lee | H04N 1/387 358/450 |
| 2013/0050202 A1* | 2/2013 | Ueno et al. | 345/419 |
| 2013/0120224 A1* | 5/2013 | Cajigas et al. | 345/8 |
| 2013/0182858 A1* | 7/2013 | You et al. | 381/58 |
| 2013/0272523 A1* | 10/2013 | McCorkindale et al. | 380/243 |
| 2013/0321838 A1* | 12/2013 | Ono | G06F 3/1255 358/1.13 |
| 2014/0002496 A1* | 1/2014 | Lamb et al. | 345/633 |
| 2014/0015942 A1* | 1/2014 | Said | 348/59 |
| 2014/0063063 A1* | 3/2014 | Scott | G06T 11/60 345/633 |
| 2014/0111420 A1* | 4/2014 | Ahn et al. | 345/156 |
| 2014/0320919 A1* | 10/2014 | Kowaka | 358/1.15 |
| 2015/0017626 A1* | 1/2015 | Basson et al. | 434/353 |

FOREIGN PATENT DOCUMENTS

| | | | |
|---|---|---|---|
| JP | 2008-70835 A | 3/2008 |
| JP | 2011041046 A | 2/2011 |
| JP | 2012014402 A | 1/2012 |
| JP | 2013-26922 A | 2/2013 |
| JP | 2013-225245 A | 10/2013 |
| WO | 2012/049795 A1 | 4/2012 |
| WO | WO 2013-161182 A1 | 10/2013 |

OTHER PUBLICATIONS

Japanese Notice of Reason for Refusal issued by the Japan Patent Office on Aug. 4, 2015 in corresponding Japanese Patent Application No. 2013-238312, and English language translation of Notice of Reason of Refusal; 13 pages.

Satoshi Kunda et al., "Document Interface Using Augmented Reality", The Institute of Electronics, Information and Communication Engineers Technical Report, Japan, The Institute of Electronics, Information and Communication Engineers, Feb. 16, 2006, vol. 105, No. 614, pp. 79-84, and partial English translation of pp. 80-82; 9 pages.

Japanese Office Action with English translation, corresponding to Japanese Patent Application No. 2013-238312, dated Oct. 27, 2015; 8 pages.

* cited by examiner

FIG.16
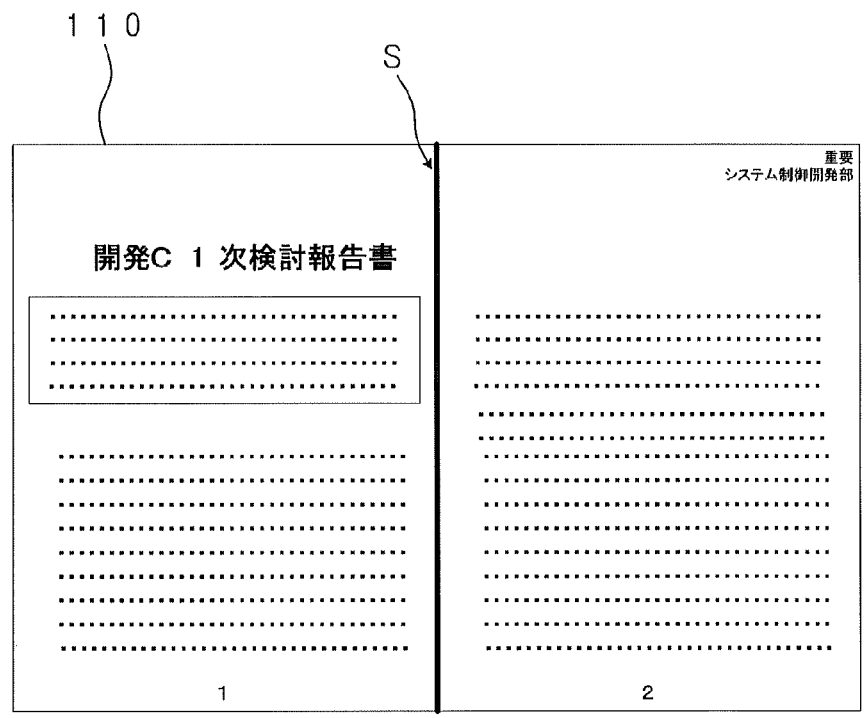
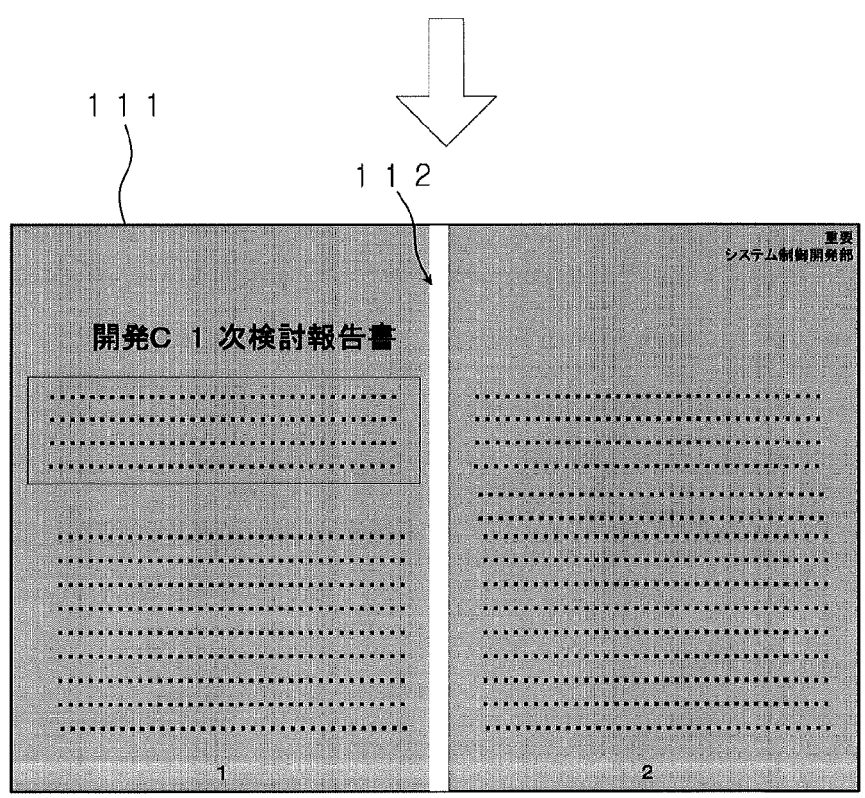

FIG.17
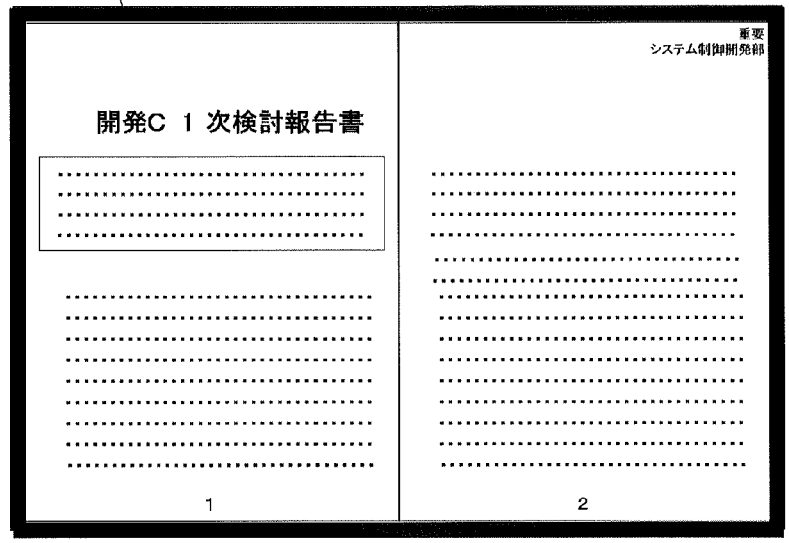
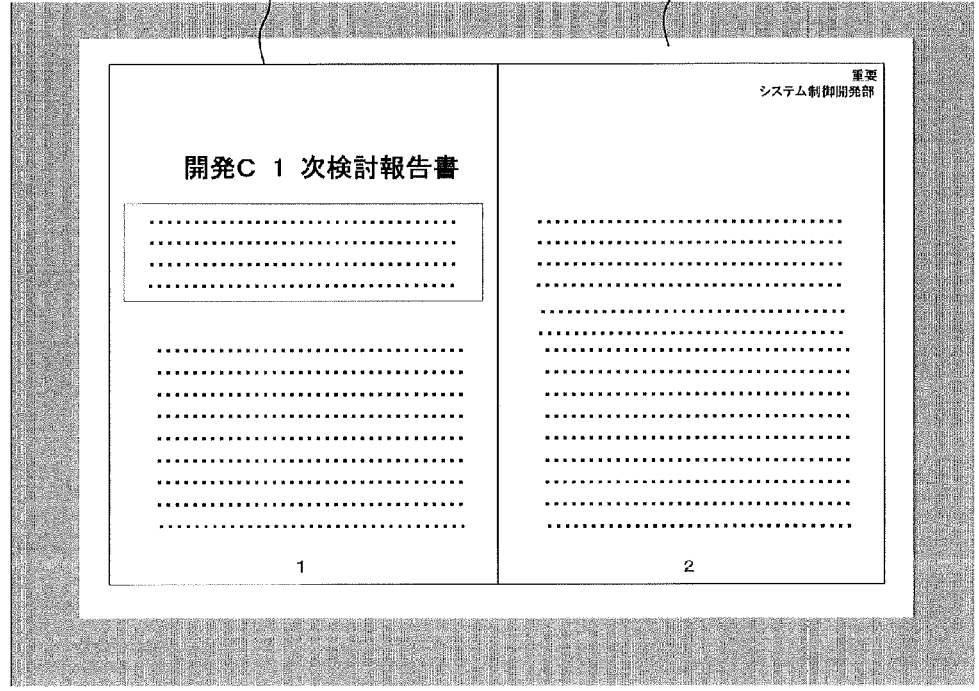

FIG.22

ISO 216 SIZES
(JAPANESE INDUSTRIAL
STANDARD (JIS) P0138)
A SERIES

|     | SIZE (mm)   |
| --- | ----------- |
| A 0 | 841 × 1189  |
| A 1 | 594 × 841   |
| A 2 | 420 × 594   |
| A 3 | 297 × 420   |
| A 4 | 210 × 297   |
| A 5 | 148 × 210   |
| A 6 | 105 × 148   |
| A 7 | 74 × 105    |
| A 8 | 52 × 74     |

JIS P0138
B SERIES

|     | SIZE (mm)   |
| --- | ----------- |
| B 0 | 1030 × 1456 |
| B 1 | 728 × 1030  |
| B 2 | 515 × 728   |
| B 3 | 364 × 515   |
| B 4 | 257 × 364   |
| B 5 | 182 × 257   |
| B 6 | 128 × 182   |
| B 7 | 91 × 128    |
| B 8 | 64 × 91     |

OTHERS

|                 | SIZE (mm) |
| --------------- | --------- |
| VISITING CARD   | 91 × 55   |
| POSTAL CARD     | 100 × 148 |
| DOUBLE POSTCARD | 200 × 148 |

AR DISPLAY DEVICE IN WHICH AN IMAGE IS OVERLAPPED WITH A REALITY SPACE, AR DISPLAY CONTROL DEVICE, PRINT CONDITION SETTING SYSTEM, PRINT SYSTEM, PRINT SETTING DISPLAY METHOD, AND NON-TRANSITORY COMPUTER-READABLE RECORDING MEDIUM

BACKGROUND OF THE INVENTION

1. Field of the Invention

The present invention relates to a technology for simulatedly and visually displaying a processing result of each process to be carried out for an image or an output sheet by a printing apparatus.

2. Description of Related Art

In case that an original is copied, the post-processing, such as the processing in which the mark indicating "confidential" or the like is synthesized as a watermark, the folding, the binding, the punching or the like, is often carried out for the printed sheet. In case that such an additional processing is carried out, a user normally sets the additional processing via an operation panel of a printing apparatus. However, before the printing, it is difficult for the user to correctly estimate the finish state of the printed matter to be prepared in accordance with the set additional processing. For example, it is difficult to correctly recognize the overlap between the stable position or the punch hole and the printed character or the printed image and the positional relation therebetween.

Therefore, an image forming apparatus for reading an original by using a scanner and for preparing a preview image indicating the finish state in which the post-processing, such as the punching, is carried out for the sheet on which the read image is printed, to display the preview image on an operation panel, has been proposed (for example, see Japanese Patent Application Publication No. 2008-70835).

Further, a system comprising an image forming apparatus for outputting the printed matter in which the AR (Augmented Reality) tag for designating a predetermined image registered in a server is added to a basic original, and a portable terminal for picking up the image of the printed matter, is disclosed. In the above system, the portable terminal which picks up the image of the printed matter obtains the image (for example, a map or the like) related to the AR tag added to the printed matter from the server and the AR display of the obtained image is carried out by overlapping the obtained image around the AR tag in the image which is picked up (for example, See Japanese Patent Application Publication No. 2013-026922).

In the image forming apparatus disclosed in Japanese Patent Application Publication No. 2008-70835, in order to display the preview image of the finish state, it is necessary to read the original by using the scanner. As a result, the troublesome task is caused. Further, because the preview image is displayed on a small screen of the operation panel, it is difficult to confirm the correct finish state.

In the technology disclosed in Japanese Patent Application Publication No. 2013-026922, only the image related to the AR tag is displayed by carrying out the AR display in which the image is overlapped around the AR tag. When the printed matter is inclined, the angle of the print matter and the angle of the image are misaligned. Therefore, even though the above technology is applied and the AR display is carried out by overlapping the image of the finish state with the sheet, the angle of the sheet and the angle of the image are misaligned when the sheet is not held in a correct posture. As a result, it is not possible to correctly confirm the finish state by using the AR display.

SUMMARY

To achieve at least one of the abovementioned objects, an AR display device reflecting one aspect of the present invention comprises:

a display unit configured to display an augmented reality space in which an image is overlapped with a reality space;

a camera configured to shoot the reality space corresponding to the augmented reality space displayed by the display unit;

a setting information obtaining unit configured to obtain setting contents relating to an additional processing to be carried out for an image or an output sheet by a predetermined printing apparatus;

a detecting unit configured to detect a sheet in the reality space shot by the camera and a posture of the sheet; and a display control unit configured to prepare an output image which simulatedly shows a processing result to be obtained in case that the predetermined printing apparatus carries out the additional processing in accordance with the setting contents obtained by the setting information obtaining unit, the output image being corrected so as to match the output image with the posture of the sheet detected by the detecting unit, which exists in the reality space, and configured to instruct the display unit to display the augmented reality space in which the output image is overlapped with the sheet which exists in the reality space.

Preferably, the AR display device further comprises:

a printed area detecting unit configured to detect a printed area in which a character or an image has been already printed on the sheet which exists in the reality space, from a shot image obtained by the camera; and a warning unit configured to judge whether the processing result relating to the additional processing is overlapped with the printed area, and to carry out a predetermined warning in case that the processing result is overlapped with the printed area.

Preferably, the AR display device further comprises: a gaze detection unit configured to detect a gaze of a user, wherein when the warning unit carries out the warning, the warning unit judges whether the user views the sheet in accordance with a detecting result obtained by the gaze detection unit, and wherein in case that the user views the sheet, the warning unit instructs the display unit to display the warning, and in case that the user does not view the sheet, the warning unit carries out the warning by outputting a sound.

Preferably, the AR display device further comprises: a printed area detecting unit configured to detect a printed area in which a character or an image has been already printed on the sheet which exists in the reality space, from a shot image obtained by the camera, wherein the display control unit judges whether the processing result relating to the additional processing is overlapped with the printed area, and differentiates a display form of the output image in a portion in which the processing result is overlapped with the printed area, from another display form of the output image in a portion in which the processing result is not overlapped with the printed area.

Preferably, the AR display device further comprises:

a printed area detecting unit configured to detect a printed area in which a character or an image has been already printed on the sheet which exists in the reality space, from a shot image obtained by the camera; and a setting change instruction unit configured to judge whether the processing result relating to the additional processing is overlapped with the printed area, and to instruct an external device which receives a setting relating to the additional processing from a user, to receive a changing operation for changing the setting contents relating to the additional processing from the user incase that the processing result relating to the additional processing is overlapped with the printed area.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 16 is a view showing an actual sheet and a sheet which exists in the augmented reality space in which the output image corresponding to the output setting for the center erase is overlapped;

FIG. 17 is a view showing an actual sheet and a sheet which exists in the augmented reality space in which the output image corresponding to the output setting for the frame erase is overlapped;

FIG. 22 is a view showing the management tables indicating the sheet sizes;

DETAILED DESCRIPTION OF PREFERRED EMBODIMENT

Hereinafter, a preferred embodiment of the present invention will be explained with reference to the accompanying drawings.

Figure 1:
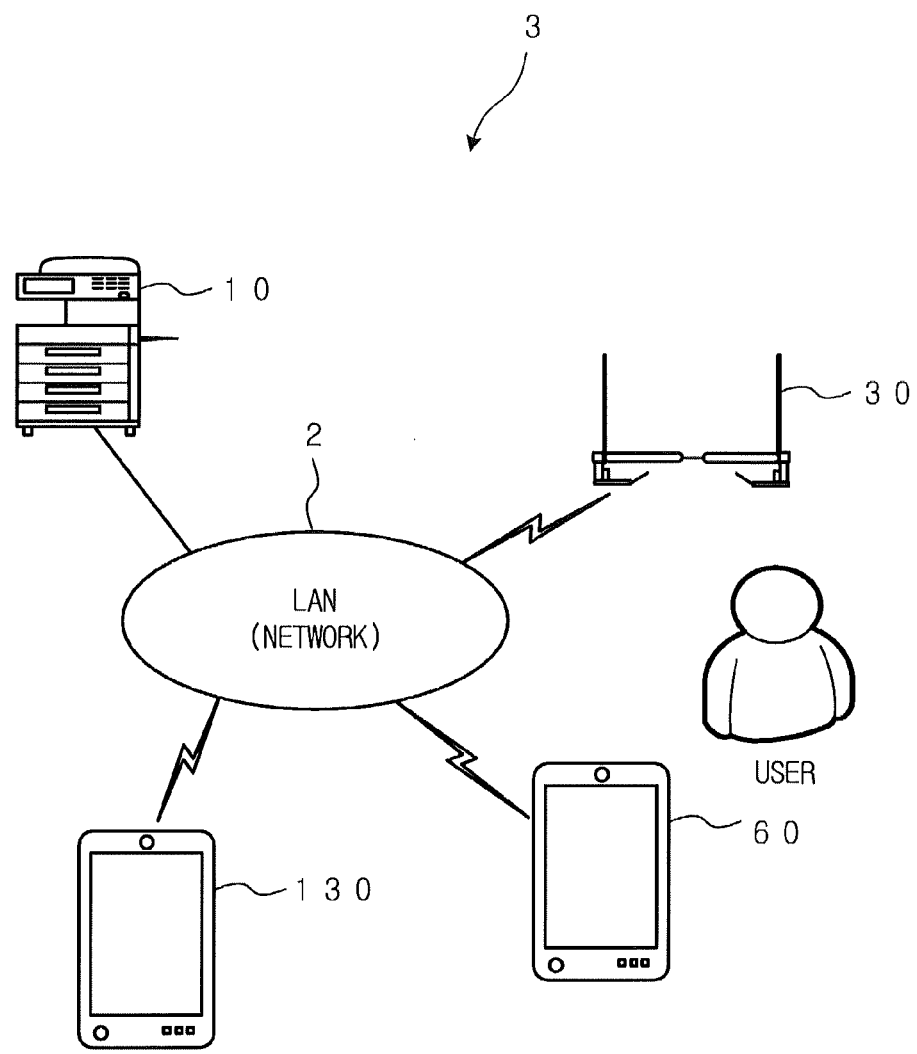
FIG. 1 is a view showing the configuration of the print system according to the embodiment.

FIG. 1 shows the schematic configuration of the print system 3 according to the embodiment. The print system 3 comprises an image forming apparatus 10, a head-mounted display (HMD) device 30 having the function as the AR (Augmented Reality) display device, a portable terminal 60 having the function as the AR display device, an AR display control device 130, which are connected with each other via a network 2, such as LAN (Local Area Network). Both of the head-mounted display device 30 and the portable terminal 60 are wirelessly connected with the network 2. The AR display device may be either one of the head-mounted display device 30 and the portable terminal 60.

The image forming apparatus 10 is a so-called multi-function peripheral (MFP) having a copy function for optically reading an original to print an image on a recording sheet, a scan function for obtaining image data by reading an original to store the image data as a file and/or to transmit the image data to an external terminal via the network 2, a printer function for printing out an image based on the print data received from an external PC (Personal Computer) or the like via the network 2 by forming the image on the recording sheet, a facsimile function for transmitting and receiving the image data in compliance with the facsimile protocol, and the like. The image forming apparatus 10 may have at least the copy function for printing an image on the recording sheet (the function of a printing apparatus).

The image forming apparatus 10 has a function for carrying out various types of additional processings for an image and/or a sheet. For example, the additional processing for an image includes a process for adding the image of the stamp, such as a watermark or the like, to an image to be printed, a process for adding a background pattern image, a center erase process for erasing a black copy mark caused along the center line by copying a spread book or the like, a frame erase process for erasing the surrounding part of the original (for example, the black copy marks caused along the borders of the original when the original is copied by opening the platen cover), a process for setting the area in which the image is not printed at the peripheral portion of the sheet in the copy process, as the page margin range, and the like.

Further, the additional processing for a sheet (a so-called post-processing) includes a process for binding a plurality of sheets by a staple, a process for punching a sheet, a process for folding a sheet, and the like. The setting relating to the above additional processing for an image and/or a sheet is referred to as the output setting.

The AR display device (the head-mounted display device 30 and/or the portable terminal 60) obtains the output setting information indicating the contents of the output setting which is set to the image forming apparatus 10, from the image forming apparatus 10 or the like. Then, the AR display device prepares the output image which simulatedly shows the processing result to be obtained when the image forming apparatus 10 carries out the additional processing defined in the output setting information, and displays the augmented reality space in which the output image is overlapped with the sheet which exists in the reality space.

For example, when a user who wears the head-mounted display device 30 views the sheet which exists in the reality space (for example, the sheet which the user holds) in the situation in which output setting relating to the half-fold is set to the image forming apparatus 10, the head-mounted display device 30 displays the augmented reality space in which the output image corresponding to the fold line of the half-fold is overlapped with the sheet which exists in the reality space. The user who wears the head-mounted display device 30 views the above augmented reality space.

The sheet which exists in the reality space is often moved or inclined in case that the user holds the sheet. Further, the sheet which exists in the reality space is often bent. Therefore, the AR display device (the head-mounted display device 30 and/or the portable terminal 60) according to the embodiment detects the position and the posture (the direction, the shape and the like) of the sheet which exists in the reality space, and corrects the output image according to the sheet which is inclined or bent. Then, the AR display device displays the augmented reality space in which the corrected output image is overlapped with the sheet which exists in the reality space.

That is, the augmented reality space is displayed as if the output image is stuck along the surface of the sheet. In other words, regardless of the posture of the actual sheet, the output image is displayed as if the additional process is carried out for the actual sheet.

Therefore, regardless of the position and the posture of the sheet, the user can view the augmented reality space as if the sheet for which the set additional processing is actually carried out exists in the reality space. For example, the processing result to be shown in the state in which the sheet is stuck to a three-dimensional object, such as a column or the like, can be confirmed previously. Further, because the AR display device carries out the detection of the position and the posture of the sheet and the correction of the output image repeatedly, even though the user moves the sheet, the output image which is corrected according to the movement of the sheet is displayed so as to overlap the corrected output image with the sheet which exists in the reality space.

The output setting to be set to the image forming apparatus 10 may be carried out by using the operation panel of the image forming apparatus 10 or by using an external terminal or a portable terminal. In this case, the AR display device obtains the output setting information from the external terminal or the portable terminal which is used for the output setting. The output setting may be carried out by using the portable terminal 60 which is the AR display device.

Figure 2:
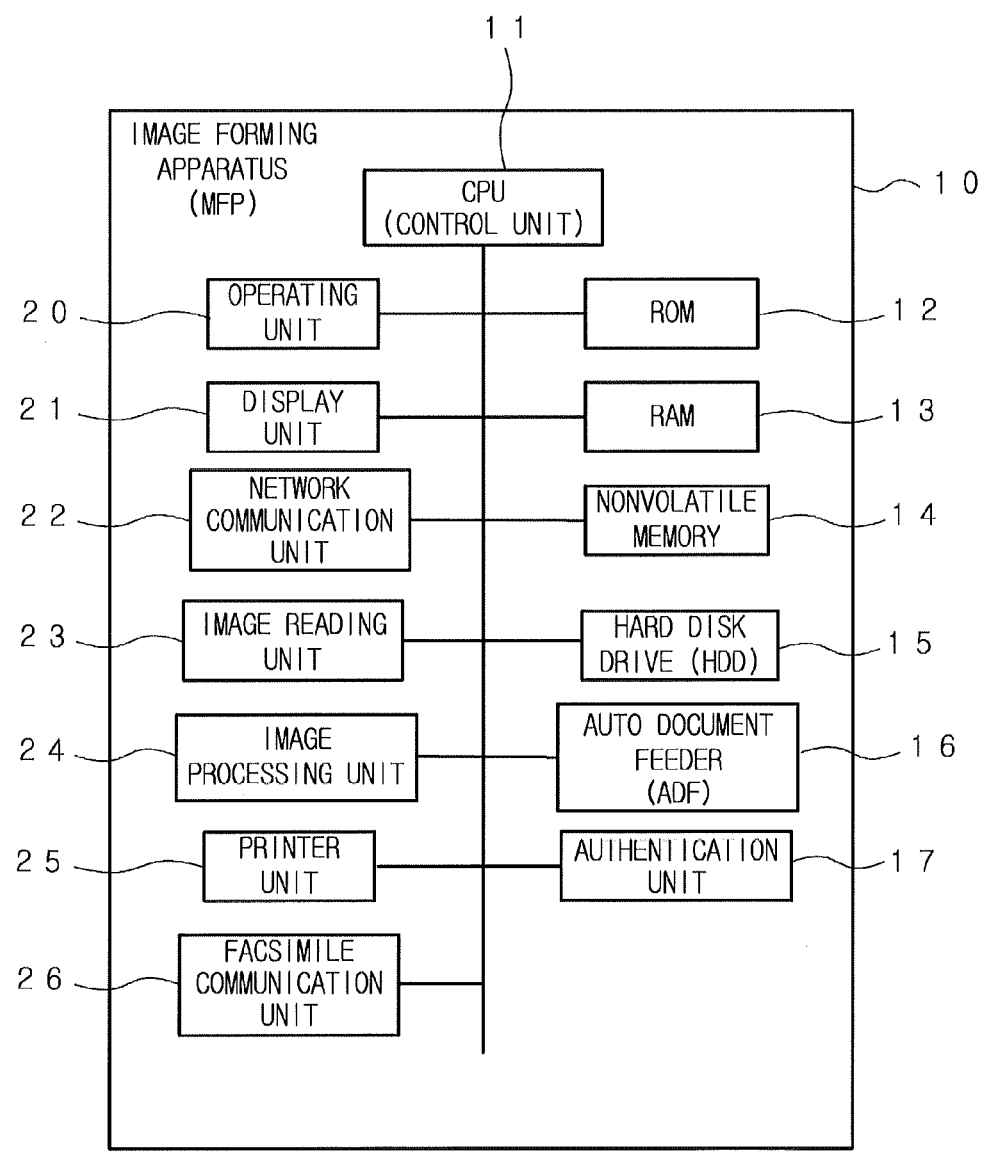
FIG. 2 is a block diagram showing the schematic configuration of the image forming apparatus included in the print system according to the embodiment.

FIG. 2 is a block diagram showing the schematic configuration of the image forming apparatus 10. The image forming apparatus 10 comprises a CPU (Central Processing Unit) 11 for controlling the whole operation of the image forming apparatus 10. The CPU 11 is connected to a ROM (Read Only Memory) 12, a RAM (Random Access Memory) 13, a nonvolatile memory 14, a hard disk drive 15, an automatic document feeder (ADF) 16, an authentication unit 17, an operating unit 20, a display unit 21, a network communication unit 22, an image reading unit 23, an image processing unit 24, a printer unit 25 a facsimile communication unit 26 and the like via a bus.

By the CPU 11, a middleware, application programs and the like are executed on an OS (Operating System) program as a base. In the ROM 12, various types of programs are stored. By executing the processes by the CPU 11 in accordance with these programs, the functions of the image forming apparatus 10 are realized.

The RAM 13 is used as a work memory for temporarily storing various data when the CPU 11 executes the process in accordance with the programs and as an image memory for storing image data.

The nonvolatile memory 14 is a memory (flash memory) in which the stored contents are not damaged even if the image forming apparatus 10 is turned off, and is used for storing various setting information and the like. The hard disk drive 15 is a large-capacity nonvolatile memory device. In the hard disk drive 15, various types of programs and data are stored in addition to the print data, the image data and the like.

The image reading unit 23 has a function for optically reading an original to obtain the image data. For example, the image reading unit 23 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line image sensor into digital image data, and the like.

The auto document feeder 16 has a function of conveying the original by feeding the original set to the original setting tray from the top sheet one by one, passing the original through the reading position of the image reading unit 23 and discharging the original to a predetermined discharge position. Further, the auto document feeder 16 has a function for automatically reversing the original to enable the image reading unit 23 to automatically read the both sides of the original. The image reading unit 23 has a function for reading the original set on a platen glass, and has a function for sequentially reading the original which is conveyed by the auto document feeder 16.

The authentication unit 17 authenticates the user who uses the image forming apparatus 10. The authenticating method may be an optional method, and in the method, a password, a fingerprint, a vein or the like may be used.

The operating unit 20 and the display unit 21 constitute the operation panel for receiving the operation, such as the entry of the job or the like, from the user. The image forming apparatus 10 receives the above-described output setting (setting relating to the additional processing) via the operation panel from the user. The display unit 21 comprises a liquid crystal display (LCD), and the like, and has a function for displaying various types of operation windows, setting windows, and the like. The operating unit 20 comprises various types of operation switches, such as a start button, and a touch panel provided on the display screen of the display unit 21. The touch panel detects the coordinate position on which the display screen of the display unit 21 is contacted by a touch pen, the user's finger or the like to operate the image forming apparatus 10.

The network communication unit 22 has a function of communicating with the AR display device, such as the head-mounted display device 30, the portable terminal 60 and the like, and an external device, such as a PC, a server, or the like, via the network 2, such as a LAN or the like.

The image processing unit 24 carries out the rasterization process for converting print data into image data, the compression/decompression process for the image data, and the like in addition to the processings, such as the enlargement/reduction and the rotation of image data.

The printer unit 25 has a function for forming an image on the recording sheet in accordance with the image data. In this embodiment, the printer unit 25 is configured as a so-called laser printer which comprises a conveying device for the recording sheet, a photoconductive drum, a charging device, a laser unit, a developing device, a transfer and separation device, a cleaning device and a fixing device, and which forms an image by the electrophotographic process. Alternatively, an image may be formed by another type of printer. Further, the printer unit 25 has a function for carrying out the post-processing, such as the stapling of the printed sheets to bind the sheets, the punching of the sheets, the folding of the sheet, and the like.

The facsimile communication unit 26 has a function of transmitting and receiving the image data to/from an external device having the facsimile function via a telephone line.

Figure 3:
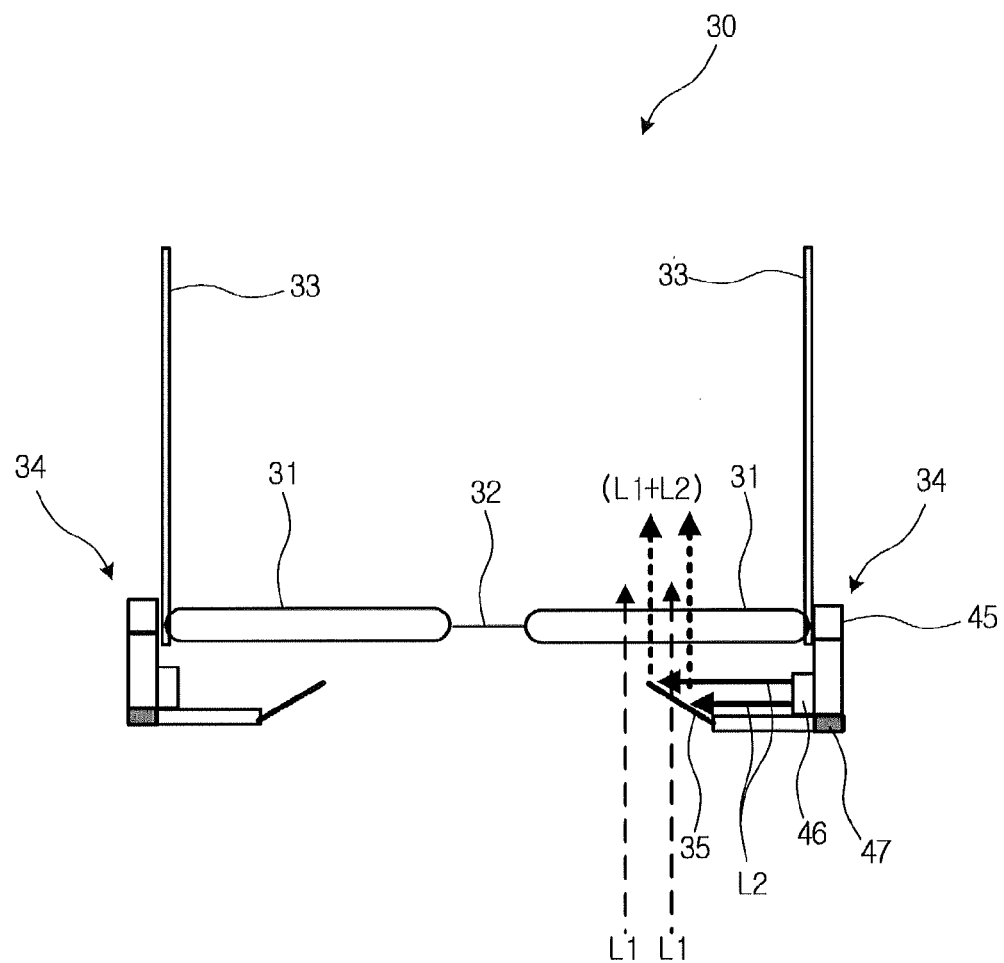
FIG. 3 is a view showing the external appearance of the head-mounted display device as the AR display device included in the print system according to the embodiment.

FIG. 3 shows the schematic configuration of the head-mounted display device 30. The head-mounted display device 30 has a form which is similar to that of an eye glasses, and is used by mounting it on a human's head. In the head-mounted display device 30 of this embodiment, the system in which an image is overlapped with the outside scene by using half mirrors (so-called, the light transmission type), is adopted.

The head-mounted display device 30 comprises display units 31 which are arranged in front of the user's right and left eyes, respectively when the user wears the head-mounted display device 30, a bridge 32 for connecting between the right and left display units 31, temples 33 which extend in the same direction from each end portion of the right and left display units 31 connected by the bridge 32 and which are put on the user's ears, and the like.

On each end portion of the display units 31, a main unit 34 including a control circuit, a projecting unit 46, a camera unit 47 and the like, is provided. Further, a half mirror 35 is supported by a support member extending from each of the main units 34 so as to be arranged in front of each display unit 31.

The half mirror 35 is provided so as to slant at the angle of 45 degree with respect to the light L1 which is incident from the front of the head-mounted display device 30 to the display unit 31. The projecting unit 46 of the main unit 34 projects the image (which is the image light L2 for forming the augmented reality information) to the half mirror 35. The half mirror 35 is formed by coating a reflective film (a metal film and a dielectric film) on a transparent substrate (glass substrate). In the half mirror 35, the ratio of the amount of the transmitted light to the amount of the reflected light is 1:1.

The light obtained by synthesizing the outside light L1 and the image light L2 at the ratio of 1:1 is incident to eyes of the user who wears the head-mounted display device 30 via the display units 31. That is, the user who wears the head-mounted display device 30 views the situation which is obtained by overlapping the outside scene with the image projected by the projecting unit 46 at the transmittance of 50%.

Figure 4:
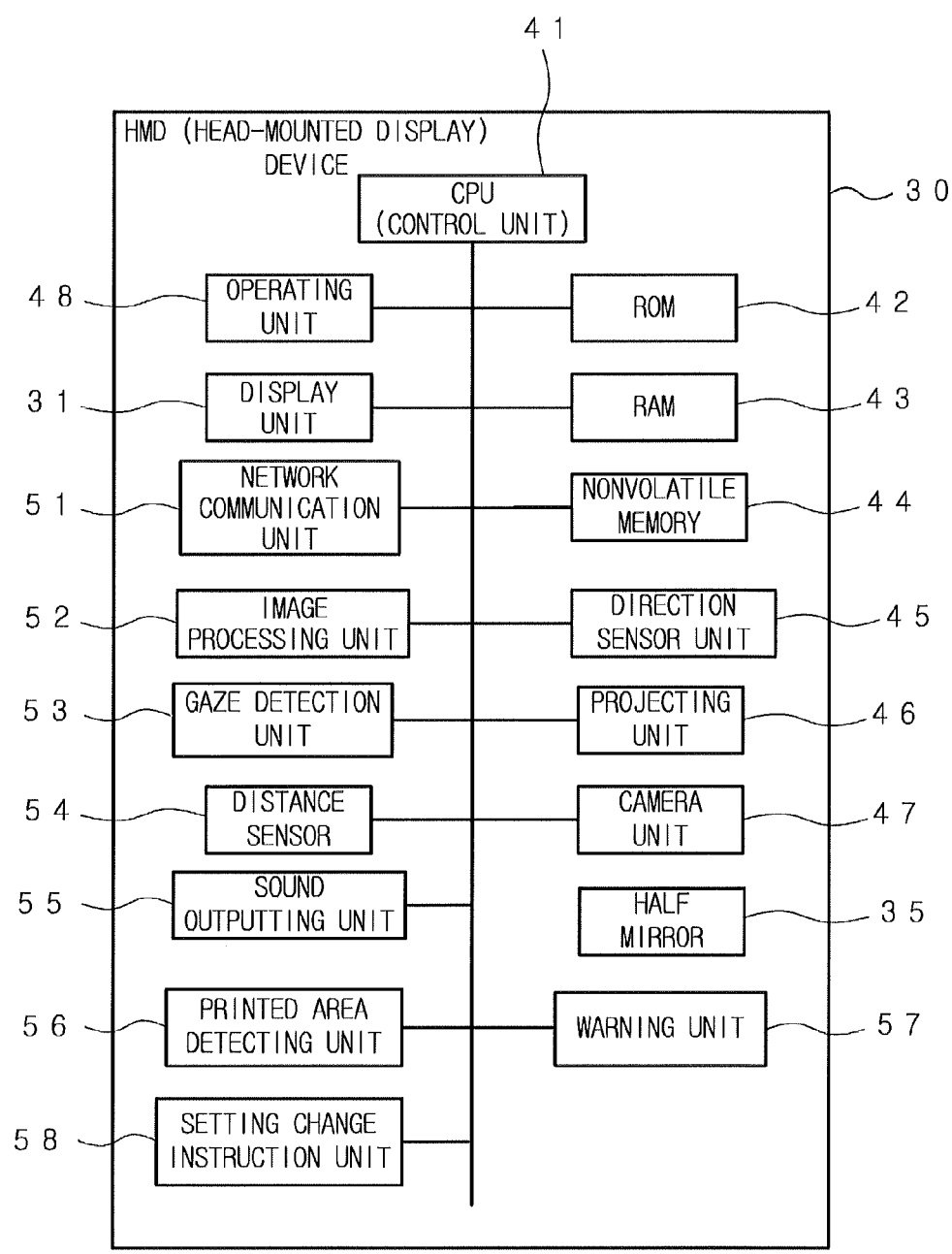
FIG. 4 is a block diagram showing the configuration of the head-mounted display device as the AR display device included in the print system according to the embodiment.

FIG. 4 is a block diagram showing the configuration of the head-mounted display device 30. The head-mounted display device 30 comprises a CPU 41 which functions as a control unit, a ROM 42, a RAM 43, a nonvolatile memory 44, a direction sensor unit 45, the projecting unit 46, the camera unit 47, an operating unit 48, the display unit 31, a network communication unit 51, an image processing unit 52, a gaze detection unit 53, a distance sensor 54, a sound outputting unit 55, a printed area detecting unit 56, a warning unit 57, a setting change instruction unit 58 and the like, which are connected with the CPU 41 via a bus.

The CPU 41 controls the operation of the head-mounted display device 30 in accordance with programs stored in the ROM 42 or the nonvolatile memory 44. Further, the CPU 41 also functions as the display control unit for instructing the display unit 31 to display the augmented reality space in which the output image is overlapped with the sheet which exists in the reality space. Further, the CPU 41 functions as the detecting unit for detecting the sheet which exists in the reality space shot by the camera unit 47 and the posture of the sheet. In the ROM 42, the programs, the fixed data and the like are stored. The RAM 43 is used as a work memory for temporarily storing various data when the CPU 41 executes the programs. In the nonvolatile memory 44, various types of setting information, application programs and the like are stored.

The direction sensor unit 45 detects the direction and the posture of the head-mounted display device 30 and the change in the direction and the posture. The direction sensor unit 45 comprises a plurality of geomagnetic sensors and a plurality of acceleration sensors so as to combine them. The direction sensor unit 45 detects the posture of the user who wears the head-mounted display device 30, the direction in which the user faces and the angle at which the user faces (the direction and the angle which are detected by the direction sensor unit 45 are coincident with the shooting direction and the shooting angle of the camera unit 47). Further, in case that the head-mounted display device 30 is inclined, the direction sensor unit 45 detects the direction and the speed of the motion of the head-mounted display device 30. Then, the direction sensor unit 45 transmits the detection result to the CPU 41. In accordance with the detection result transmitted from the direction sensor unit 45, the CPU 41 recognizes the posture of the user who wears the head-mounted display device 30, the angle of the head-mounted display device 30, and the direction and the speed of the motion of the head-mounted display device 30, which is caused by inclining the head-mounted display device 30.

The projecting unit 46 projects the image (which is the image light L2 for forming the augmented reality information), toward the half mirror 35 as described above.

The camera unit 47 carries out the shooting in the front direction of the head-mounted display device 30. In detail, the camera unit 47 carries out the shooting in the range which is substantially the same as the user's field of view in case that the user looks forward. The camera unit 47 may be provided on each of the right and left main units 34, or on one of the right and left main units 34. The camera unit 47 takes the movie, for example, the camera unit 47 takes the images at 30 frames per second.

The operating unit 48 comprises switches and the like which are provided in the main units 34 and the like, and is used for adjusting the brightness of the projected image and the like.

The network communication unit 51 has a function of communicating with an external device, such as the image forming apparatus 10 and the like, via the network 2 including the wireless LAN. Further, the network communication unit 51 functions as the setting information obtaining unit for obtaining the setting contents relating to the additional processing to be carried out for the image or the output sheet by the predetermined image forming apparatus, from an external device.

The image processing unit 52 prepares and corrects (enlarges, reduces and deforms) the image (the above-described output image, or the like) to be projected to each display unit 31 from each projecting unit 46 via each half mirror 35, or carries out the above preparation and correction of the image together with the CPU 41.

The gaze detection unit 53 detects the gaze of the user who wears the head-mounted display device 30 (what the user views). The gaze detecting method may be an optional method. For example, a camera for shooting the user's eyes is provided, and the shot image obtained by the camera is analyzed to detect the user's gaze from the direction of the user's face, the position of the pupil in the user's eye, and the like. The head-mounted display device 30 can recognize the place which is viewed by the user who wears the head-mounted display device 30, by detecting the user's gaze with the gaze detection unit 53.

The distance sensor 54 measures the distances from the head-mounted display device 30 to various types of objects which exist in the shooting range of the camera unit 47, or the distance from the head-mounted display device 30 to the object which is viewed by the user who wears the head-mounted display device 30. For example, the distance sensor 54 is configured by an ultrasonic sensor.

The sound outputting unit 55 is used in case that the warning is output as the sound. The sound outputting unit 55 is configured as a part of the warning unit for carrying out the warning.

The printed area detecting unit 56 detects the printed area in which the character or the image has been already printed on the sheet which exists in the reality space, from the shot image obtained by the camera unit 47.

The warning unit 57 judges whether the processing result relating to the predetermined additional processing is overlapped with the printed area, and carries out the predetermined warning in case that the processing result is overlapped with the printed area. In this embodiment, in case that the user does not view the sheet, the warning unit 57 instructs the sound output sound 55 to output the warning as the sound. In case that the user views the sheet, the warning unit 57 instructs the display unit 31 to display the warning image 97b (See FIG. 11 and the like).

The setting change instruction unit 58 judges that the processing result relating to the predetermined additional processing is overlapped with the printed area, and instructs the external device which receives the setting relating to the additional processing from the user, to receive the changing operation for changing the setting contents relating to the relevant additional processing from the user in case that the processing result relating to the additional processing is overlapped with the printed area.

The CPU 41 of the head-mounted display device 30 detects the sheet which exists in the shot image obtained by the camera unit 47 and the position and the posture of the sheet by analyzing the shot image. Further, the head-mounted display device 30 measures the distance to the detected sheet by using the distance sensor 54, and recognizes the size of the actual sheet in accordance with the measured distance and the size of the image of the sheet which exists in the shot image. Further, by measuring the distance to each portion of the sheet with the distance sensor 54 and by collecting and analyzing the measured distance, the head-mounted display device 30 recognizes the three-dimension shape (slant, bentness, fold and the like) of the sheet viewed from the head-mounted display device 30. For example, the recognition of the three-dimension shape can be carried out by using the known technology disclosed in Japanese Patent Application Publication No. 2008-26243 and the corresponding US Patent Application Publication No. 2008/0024795A1 which are herein incorporated by reference. The posture of the sheet and the three-dimensional shape which is viewed from the head-mounted display device 30 may be recognized by using a stereo camera as the camera unit 47 and by analyzing the video obtained by the stereo camera.

Figure 5:
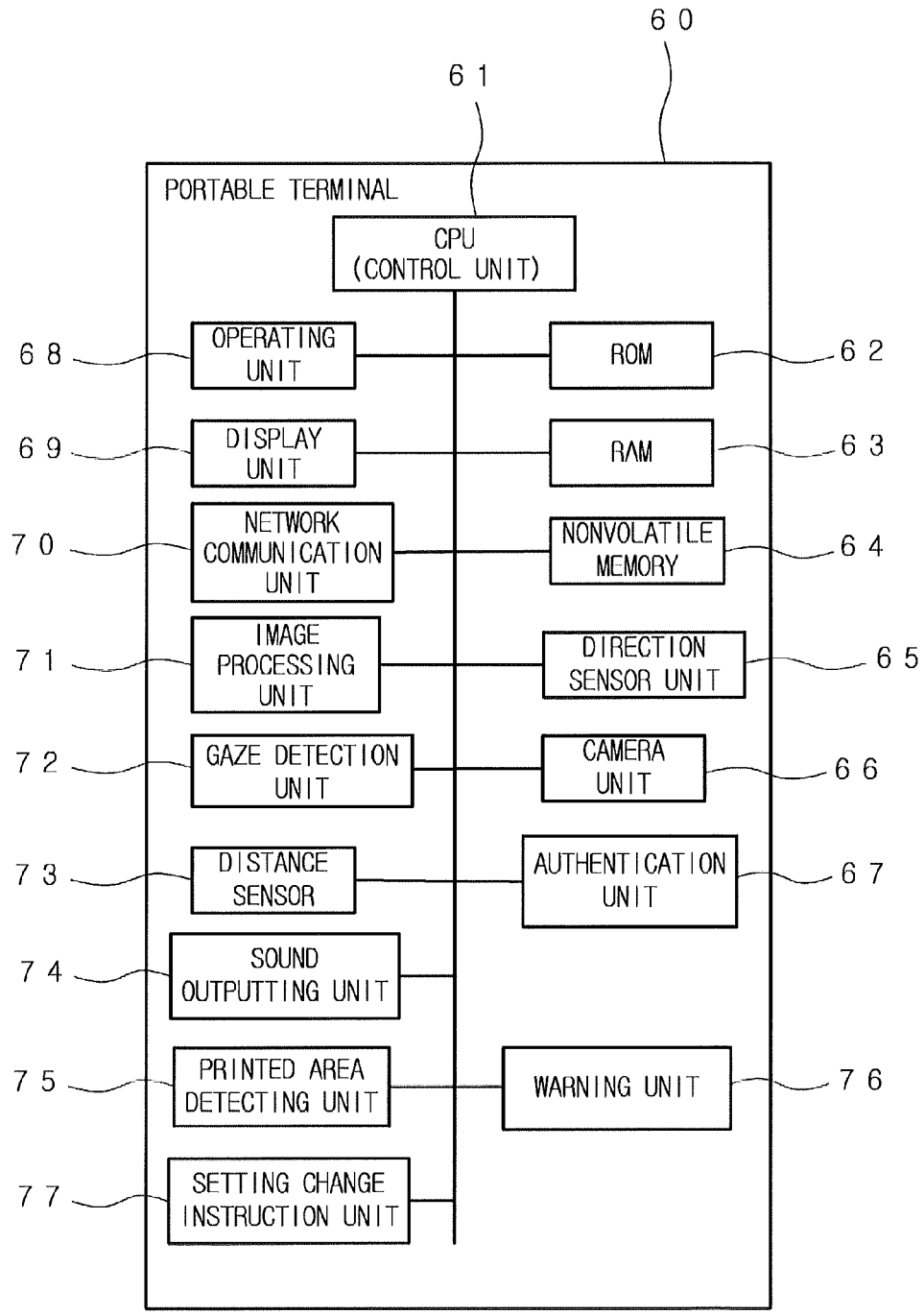
FIG. 5 is a block diagram showing the schematic configuration of the portable terminal as the AR display device included in the print system according to the embodiment.

FIG. 5 shows the schematic configuration of the portable terminal 60. The portable terminal 60 comprises a CPU 61, a ROM 62, a RAM 63, a nonvolatile memory 64, a direction sensor unit 65, a camera unit 66, an authentication unit 67, an operating unit 68, a display unit 69, a network communication unit 70, an image processing unit 71, a gaze detection unit 72, a distance sensor 73, a sound outputting unit 74, a printed area detecting unit 75, a warning unit 76, a setting change instruction unit 77, and the like, which are connected with the CPU 61 via a bus.

The CPU 61 controls the operation of the portable terminal 60 in accordance with programs stored in the ROM 62 or the nonvolatile memory 64. Further, the CPU 61 also functions as the display control unit for instructing the display unit 69 to display the augmented reality space in which the output image is overlapped with the sheet which exists in the reality space. Further, the CPU 61 functions as the detecting unit for detecting a sheet which exists in the reality space shot by the camera unit 66 and the posture of the sheet. In the ROM 62, the programs, the fixed data and the like are stored. The RAM 63 is used as a work memory for temporarily storing various data when the CPU 61 executes the programs. In the nonvolatile memory 64, various types of setting information and application programs are stored.

The direction sensor unit 65 detects the direction and the posture of the portable terminal 60 and the change in the direction and the posture. The direction sensor unit 65 has the same configuration as the direction sensor unit 45 of the head-mounted display device 30.

The camera unit 66 is provided on the rear surface of the portable terminal 60 and carries out the shooting in the direction in which the rear surface of the portable terminal 60 faces. The camera unit 66 takes the movie, for example, the camera unit 66 takes the images at 30 frames per second.

The authentication unit 67 authenticates the user who uses the portable terminal 60. The authenticating method may be an optional method, and in the method, a password, a fingerprint, a vein or the like may be used.

The display unit 69 comprises a liquid crystal display and the like. The operating unit 68 comprises a touch panel provided on the display screen of the display unit 69, and the like.

The network communication unit 70 has a function of communicating with an external device, such as the image forming apparatus 10, and the like, via the network 2 including a wireless LAN or the like. Further, the network communication unit 70 functions as the setting information obtaining unit for obtaining the setting contents relating to the additional processing to be carried out for the image or the output sheet by the predetermined image forming apparatus, from the external device.

The image processing unit 71 prepares and corrects (enlarges, reduces and deforms) the image (the above-described output image, or the like) to be synthesized with the shot image obtained by the camera unit 66, or carries out the above preparation and correction of the image together with the CPU 61.

The gaze detection unit 72 detects the gaze of the user who uses the portable terminal 60 (what the user views). The gaze detecting method may be an optional method. For example, a camera for shooting the user's face and eyes is provided, and the shot image obtained by the camera is analyzed to detect the user's gaze from the direction of the user's face, the position of the pupil in the user's eye, and the like. The portable terminal 60 recognizes the place which is viewed by the user who uses the portable terminal 60, by detecting the user's gaze with the gaze detection unit 72.

The distance sensor 73 measures the distances from the portable terminal 60 to various types of objects which exist in the shooting range of the camera unit 66, or the distance from the portable terminal 60 to the object which is viewed by the user who uses the portable terminal 60. The distance sensor 73 is configured by an ultrasonic sensor like the distance sensor 54 of the head-mounted display device 30.

The sound outputting unit 74 is used in case that the warning is output as the sound. The sound outputting unit 74 is configured as a part of the warning unit for carrying out the warning.

The printed area detecting unit 75 detects the printed area in which the character or the image has been already printed on the sheet which exists in the reality space, from the shot image obtained by the camera unit 66.

The warning unit 76 judges whether the processing result relating to the predetermined additional processing is overlapped with the printed area, and carries out the predetermined warning in case that the processing result is overlapped with the printed area. In this embodiment, in case that the user does not view the sheet, the warning unit 76 instructs the sound output sound 74 to output the warning as the sound. In case that the user views the sheet, the warning unit 76 instructs the display unit 69 to display the warning image 97*b* (See FIG. 11 and the like).

The setting change instruction unit 77 judges that the processing result relating to the predetermined additional processing is overlapped with the printed area, and instructs the external device which receives the setting relating to the additional processing from the user, to receive the changing operation for changing the setting contents of the relevant additional processing from the user in case that the processing result relating to the additional processing is overlapped with the printed area.

In the head-mounted display device 30, the image is displayed by overlapping the output image with the information from the reality space. On the other hand, in case of the portable terminal 60, the image obtained by overlapping the output image with the sheet in the shot image obtained by the camera unit 66, is displayed on the display unit 69. The user views the augmented reality space displayed on the display unit 69 of the portable terminal 60. Further, as the method for judging whether the user views the sheet, the portable terminal 60 may judge whether the user views the display unit 69.

Next, the operation of the AR display device will be explained.

In this embodiment, the head-mounted display device 30 will be explained as an example.

In FIGS. 6 to 19, the sheet which exists in the augmented reality space viewed by the user who wears the head-mounted display device 30 in the state in which the predetermined output setting is carried out for the image forming apparatus 10 (referred to as the sheet after the output setting), and the corresponding sheet which exists in the reality space (referred to as the sheet before the output setting) are shown so as to compare them. In the sheet after the output setting, the output image is overlapped with the sheet which exists in the reality space.

Figure 6:
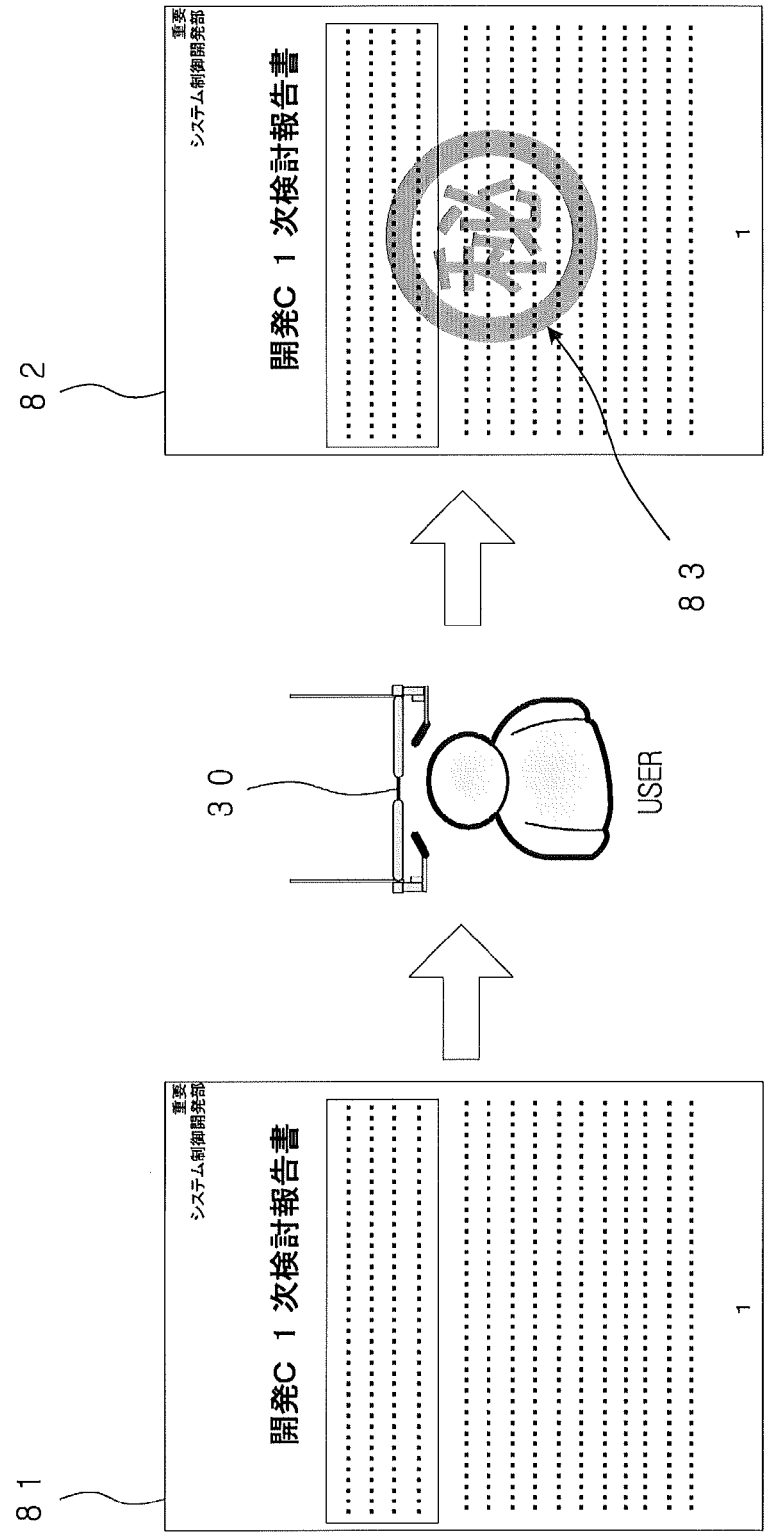
FIG. 6 is a view showing an actual sheet and a sheet which exists in the augmented reality space in which the output image corresponding to the output setting for adding the watermark is overlapped.

FIG. 6 shows the sheet 81 before the output setting and the sheet 82 after the output setting in case that, the output setting for adding the stamp, such as the watermark or the like, is carried out. In the sheet 82 after the output setting, the output image 83 corresponding to the stamp is overlapped with the sheet 81 before the output image. Therefore, the user who wears the head-mounted display device 30 can previously (before the printing) confirm the positional relation between the contents (characters and/or an image) which have been already printed on the sheet 81 before the output setting and the stamp to be added in accordance with the output setting and the relation of the densities thereof, by viewing the sheet 82 after the output setting, which is displayed by carrying out the AR display in the head-mounted display device 30.

Figure 7:
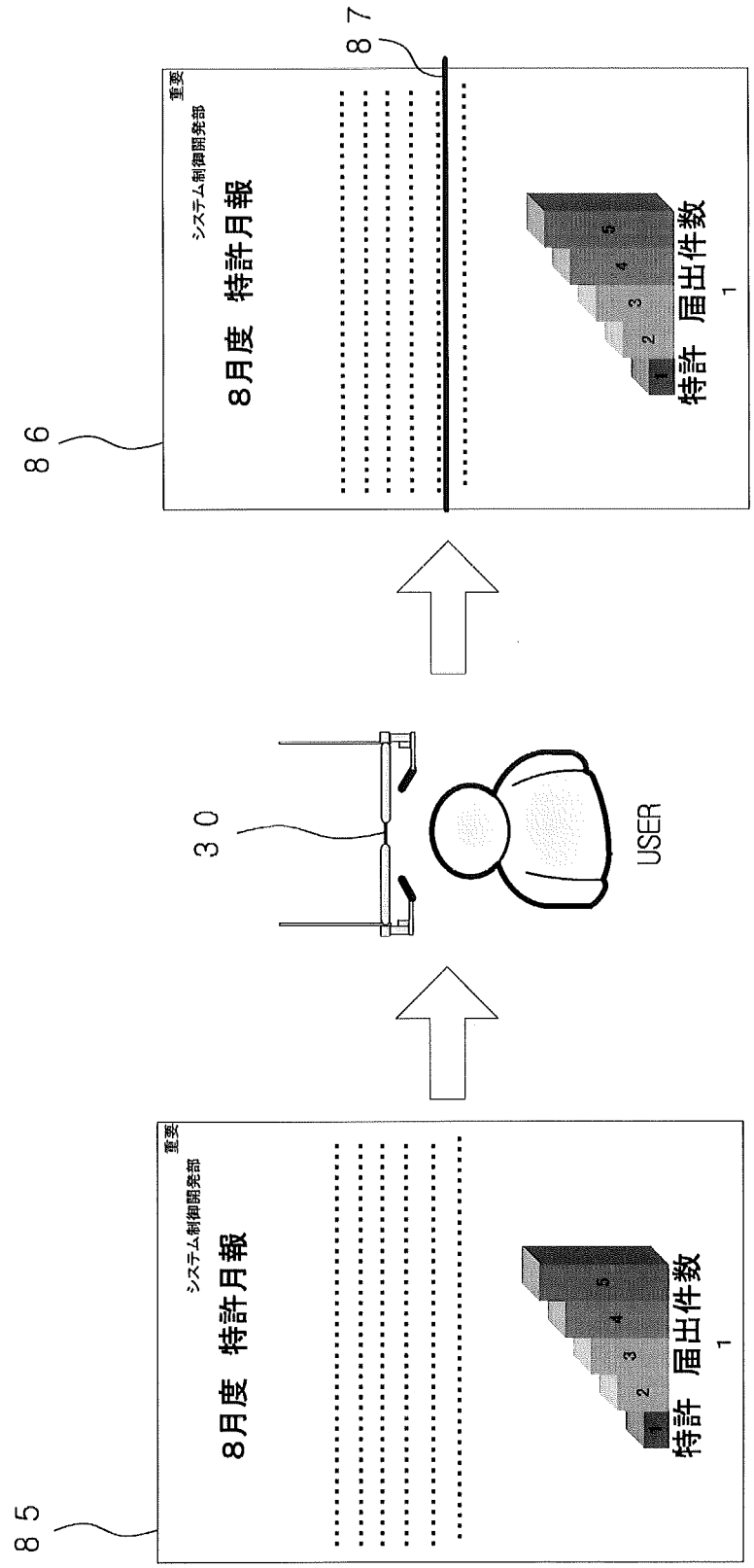
FIG. 7 is a view showing an actual sheet and a sheet which exists in the augmented reality space in which the output image corresponding to the output setting for the half-fold is overlapped.

FIG. 7 shows the sheet 85 before the output setting and the sheet 86 after the output setting in case that the output setting for the half-fold is carried out. In the sheet 86 after the output setting, the output image 87 corresponding to the fold line of the half-fold is overlapped with the sheet 85 before the output image. Therefore, the user who wears the bead-mounted display device 30 can previously confirm the positional relation between the contents (characters and/or an image) which have been already printed on the sheet 85 before the output setting and the fold line of the half-hold to be carried out in accordance with the output setting, by viewing the sheet 86 after the output setting, which is displayed by carrying out the AR display in the head-mounted display device 30.

In this embodiment, the head-mounted display device 30 judges whether the fold line of the half-fold to be carried out in accordance with the output setting is overlapped with the area in which the character and/or the image has already printed on the sheet 85 before the output setting (referred to as the printed area). The fold line is displayed as the output image 87 so as to differentiate the display form (for example, the color) of the fold line which is overlapped with the print area from the display form of the fold line which is not overlapped with the print area. That is, the head-mounted display device 30 (AR display device) comprises the printed area detecting unit 56 for detecting the printed area. Further, in case that the fold line of the half-fold to be carried out in accordance with the output setting is overlapped with the printed area, the head-mounted display device 30 instructs the external device which receives the setting relating to the additional processing (the half-hold) from the user, to receive the changing operation for changing the setting contents relating to the additional processing (the half-hold) from the user. Specifically, in the above example, the head-mounted display device 30 transmits the instruction for displaying the setting window for the output setting relating to the folding, to the image forming apparatus 10. The image forming apparatus 10 which receives the above instruction displays the setting window for receiving the output setting relating to the folding from the user, on the operation panel.

The operation for differentiating the display form of the output image in case that the processing result of the additional processing is overlapped with the print area from the display form of the output image in case that the processing result is not overlapped with the printed area, and the operation for transmitting the instruction for displaying the setting window for the relevant output setting in case that the processing result is overlapped with the printed area, to the image forming apparatus 10, are carried out also in the other following additional processings (however, except the additional processing in which the overlapping of the processing result with the printed area is postulated, such as the background pattern image and the like).

Figure 8:
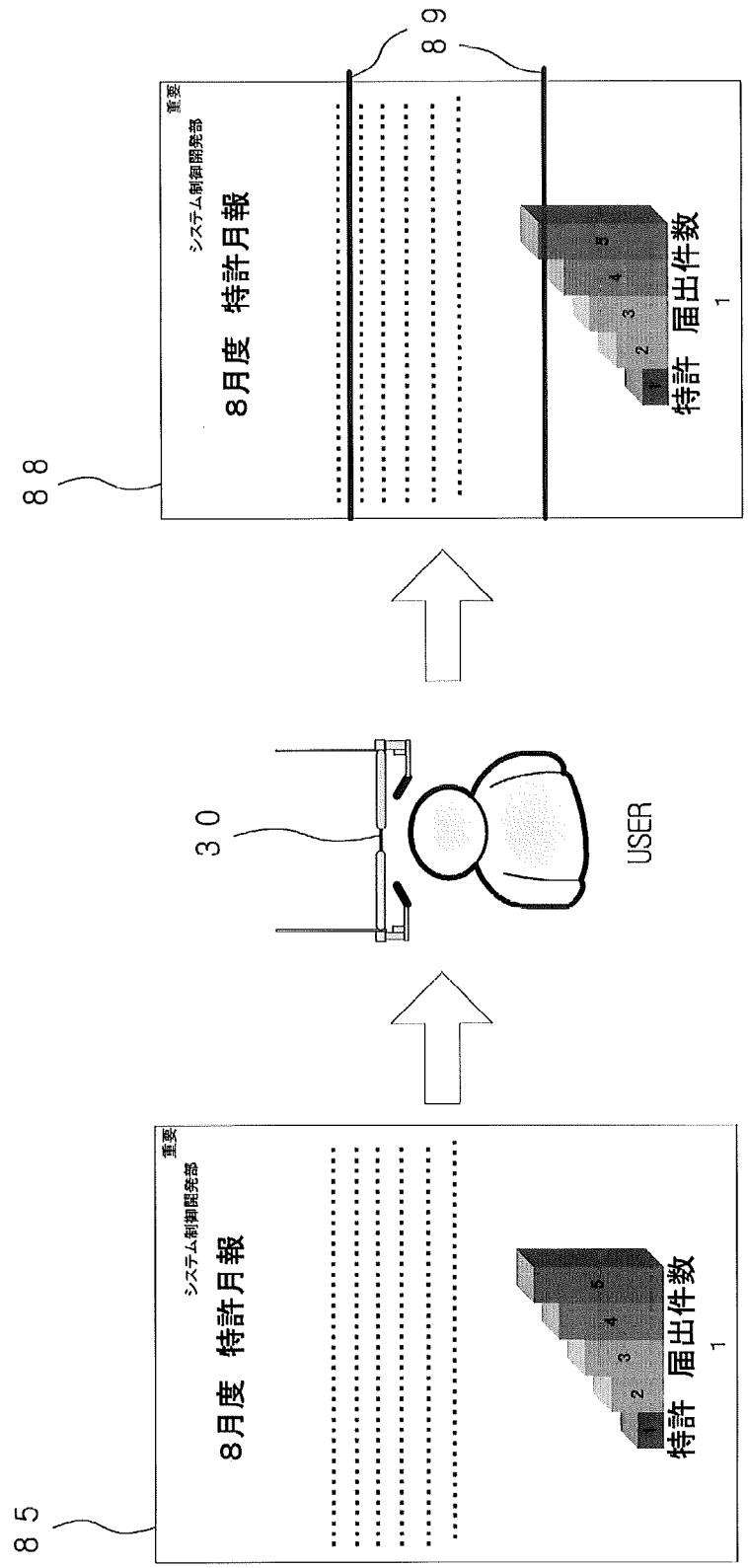
FIG. 8 is a view showing an actual sheet and a sheet which exists in the augmented reality space in which the output image corresponding to the output setting for the tri-fold is overlapped.

FIG. 8 shows the sheet 85 before the output setting and the sheet 88 after the output setting in case that the output setting for the tri-fold is carried out. In the sheet 88 after the output setting, the output image 89 corresponding to the fold lines of the tri-fold is overlapped with the sheet 85 before the output image. Therefore, the user who wears the head-mounted display device 30 can previously confirm the positional relation between the contents (characters and/or an image) which have been already printed on the sheet 85 before the output setting and the fold lines of the tri-hold to be carried out in accordance with the output setting, by viewing the sheet 88 after the output setting, which is displayed by carrying out the AR display in the head-mounted display device 30.

Figure 9:
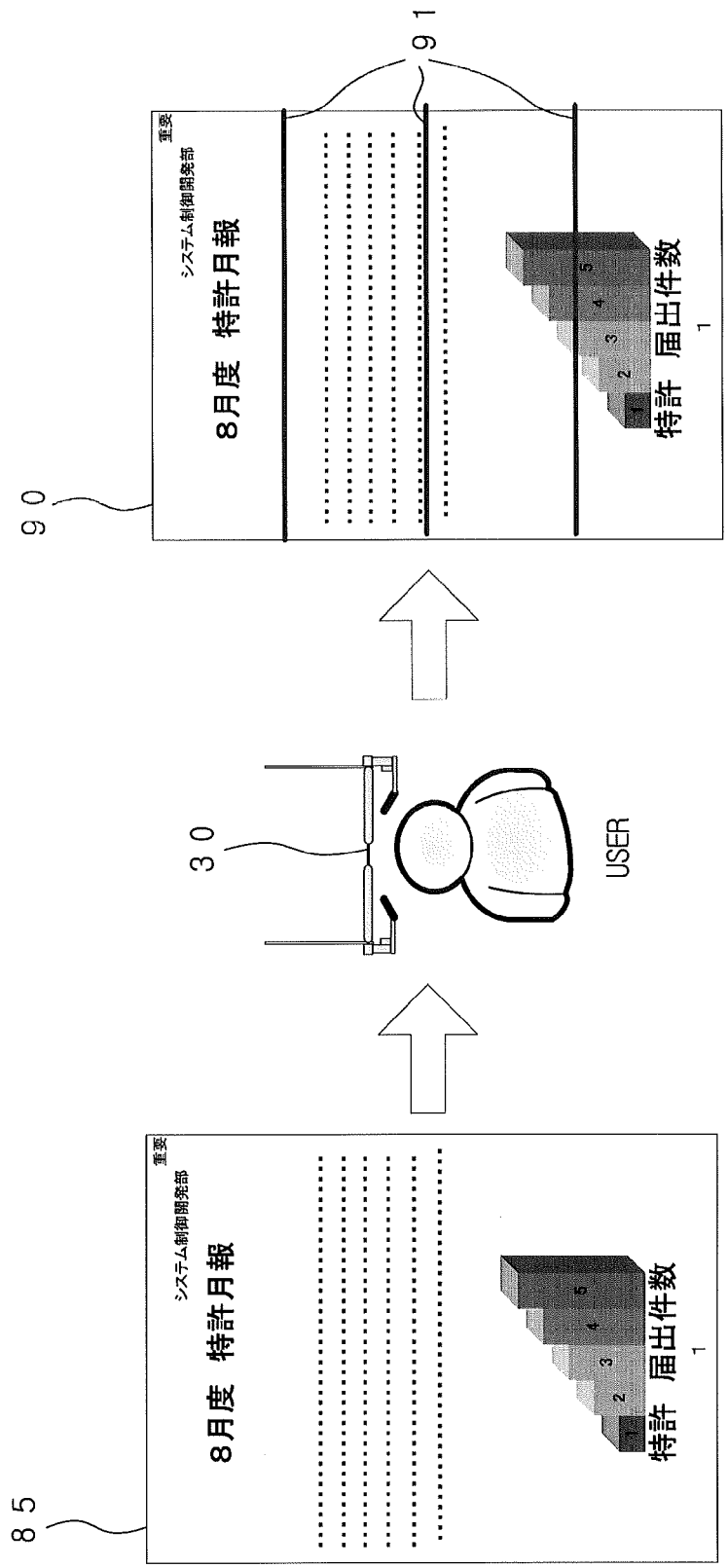
FIG. 9 is a view showing an actual sheet and a sheet which exists in the augmented reality space in which the output image corresponding to the output setting for the double parallel fold is overlapped.

FIG. 9 shows the sheet 85 before the output setting and the sheet 90 after the output setting in case that the output setting for the double parallel fold is carried out. In the sheet 90 after the output setting, the output image 91 corresponding to the fold lines of the double parallel fold is overlapped with the sheet 85 before the output image. Therefore, the user who wears the head-mounted display device 30 can previously confirm the positional relation between the contents (characters and/or an image) which have been already printed on the sheet 85 before the output setting and the fold lines of the double parallel fold to be carried out in accordance with the output setting, by viewing the sheet 90 after the output setting, which is displayed by carrying out the AR display in the head-mounted display device 30.

Figure 10:
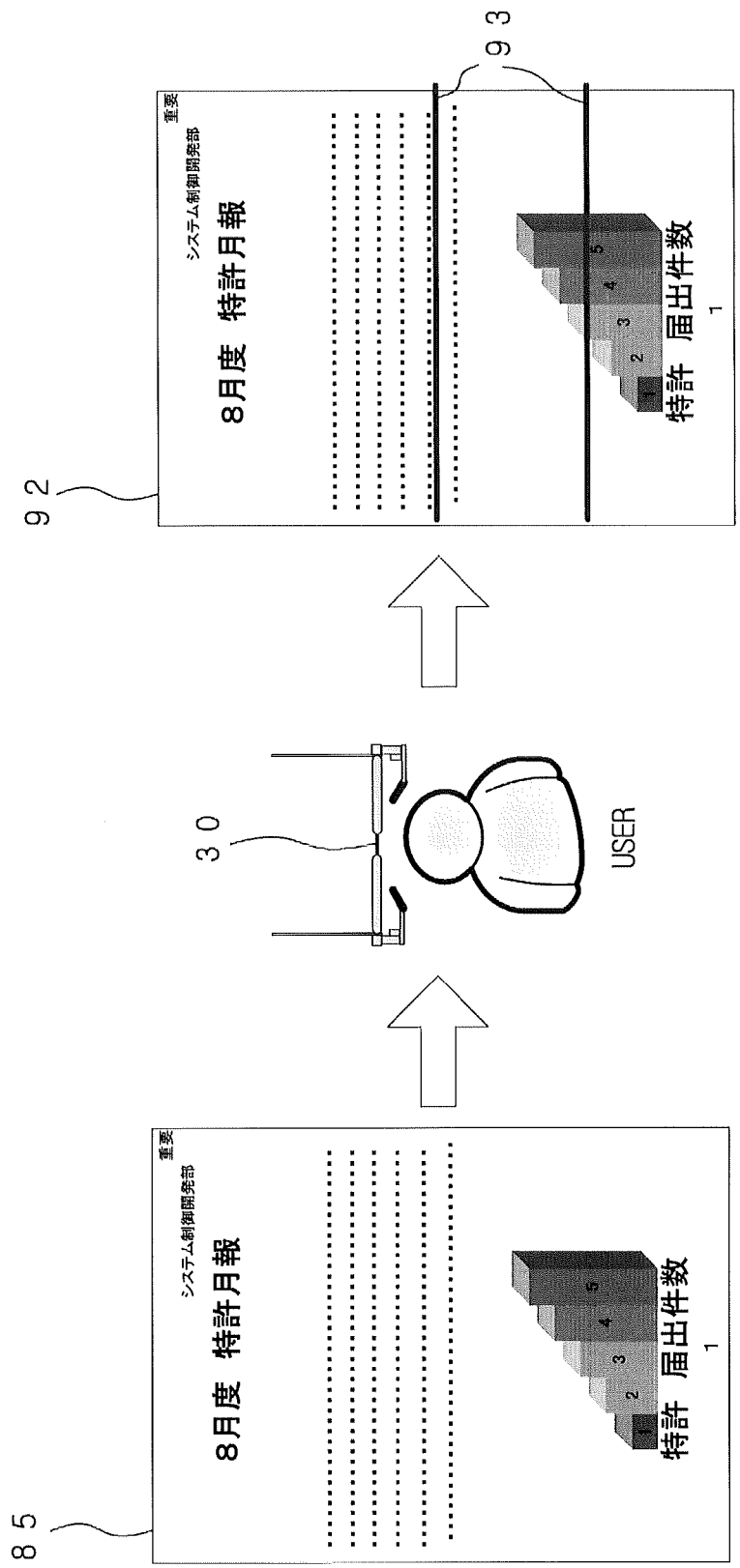
FIG. 10 is a view showing an actual sheet and a sheet which exists in the augmented reality space in which the output image corresponding to the output setting for the Z-fold is overlapped.

FIG. 10 shows the sheet 85 before the output setting and the sheet 92 after the output setting in case that the output setting for the Z-fold is carried out. In the sheet 92 after the output setting, the output image 93 corresponding to the fold lines of the Z-fold is overlapped with the sheet 85 before the output image. Therefore, the user who wears the head-mounted display device 30 can previously confirm the positional relation between the contents (characters and/or an image) which have been already printed on the sheet 85 before the output setting and the fold lines of the X-fold to be carried out in accordance with the output setting, by viewing the sheet 92 after the output setting, which is displayed by carrying out the AR display in the head-mounted display device 30.

Figure 11:
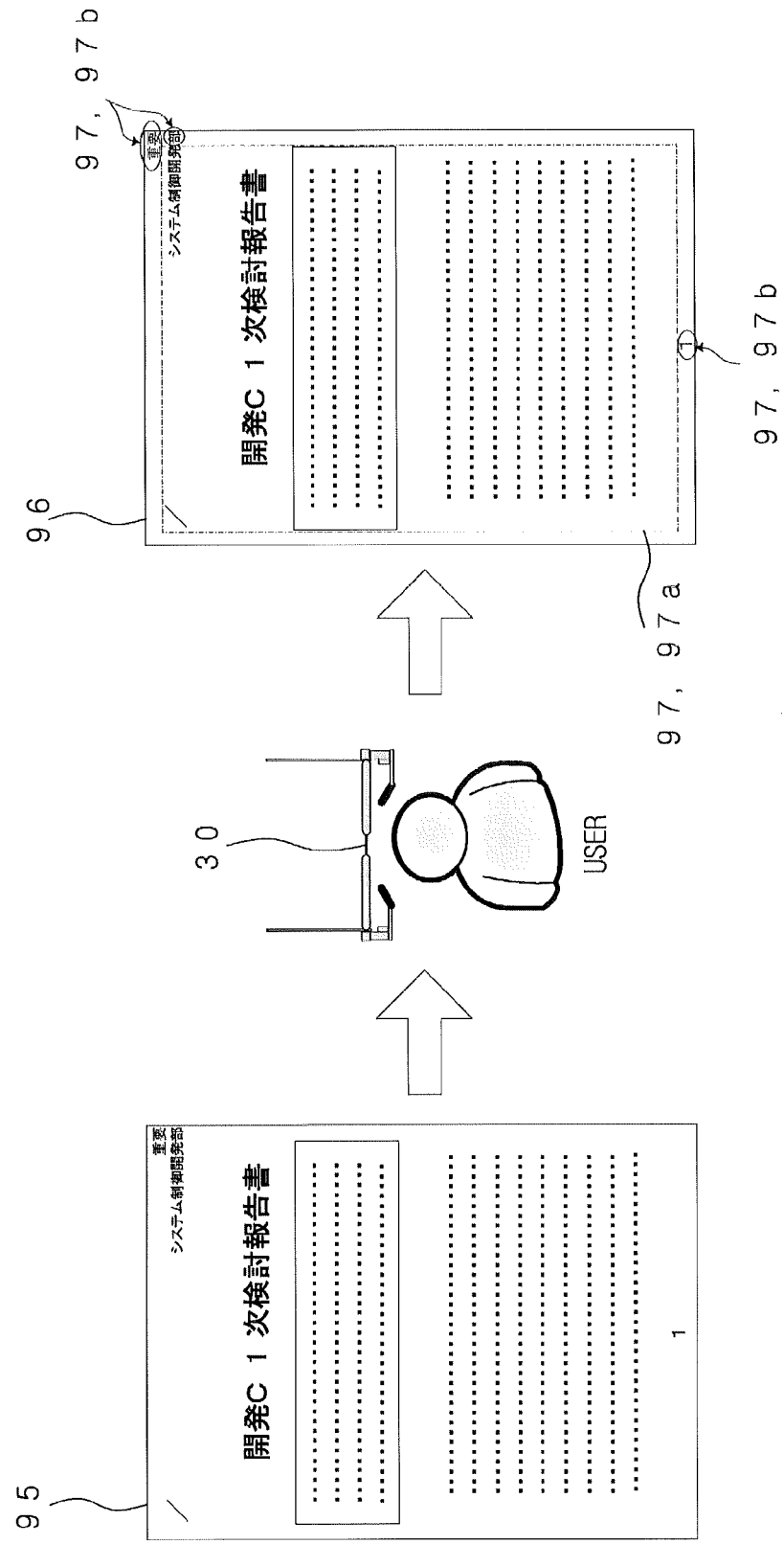
FIG. 11 is a view showing an actual sheet and a sheet which exists in the augmented reality space in which the output image corresponding to the output setting for the page margin range caused in the copy process is overlapped.

FIG. 11 shows the original (the sheet before the output setting) 95 which is read by the image reading unit 23 in the copy function and the sheet 96 after the output setting in case that the output setting for the page margin range is carried out. The output image 97 relating to the page margin range includes the border line 97*a* indicating the border between the page margin range which is the peripheral portion of the sheet and the inside area thereof and the warning image 97*b* showing the character and/or the image in the page margin range of the sheet 95 before the output setting (the original which is read by the image reading unit 23) so as to differentiate the display form (in this example, the color) thereof. In the drawing, the character which is shown as the warning image 97*b* is enclosed by the circle or the ellipse.

Because the sheet 96 after the output setting, in which the above-described output image 97 is overlapped is displayed by carrying out the AR display in the head-mounted display device 30, the user who wears the head-mounted display device 30 can previously confirm the area in which the image is not copied, on the original.

Figure 12:
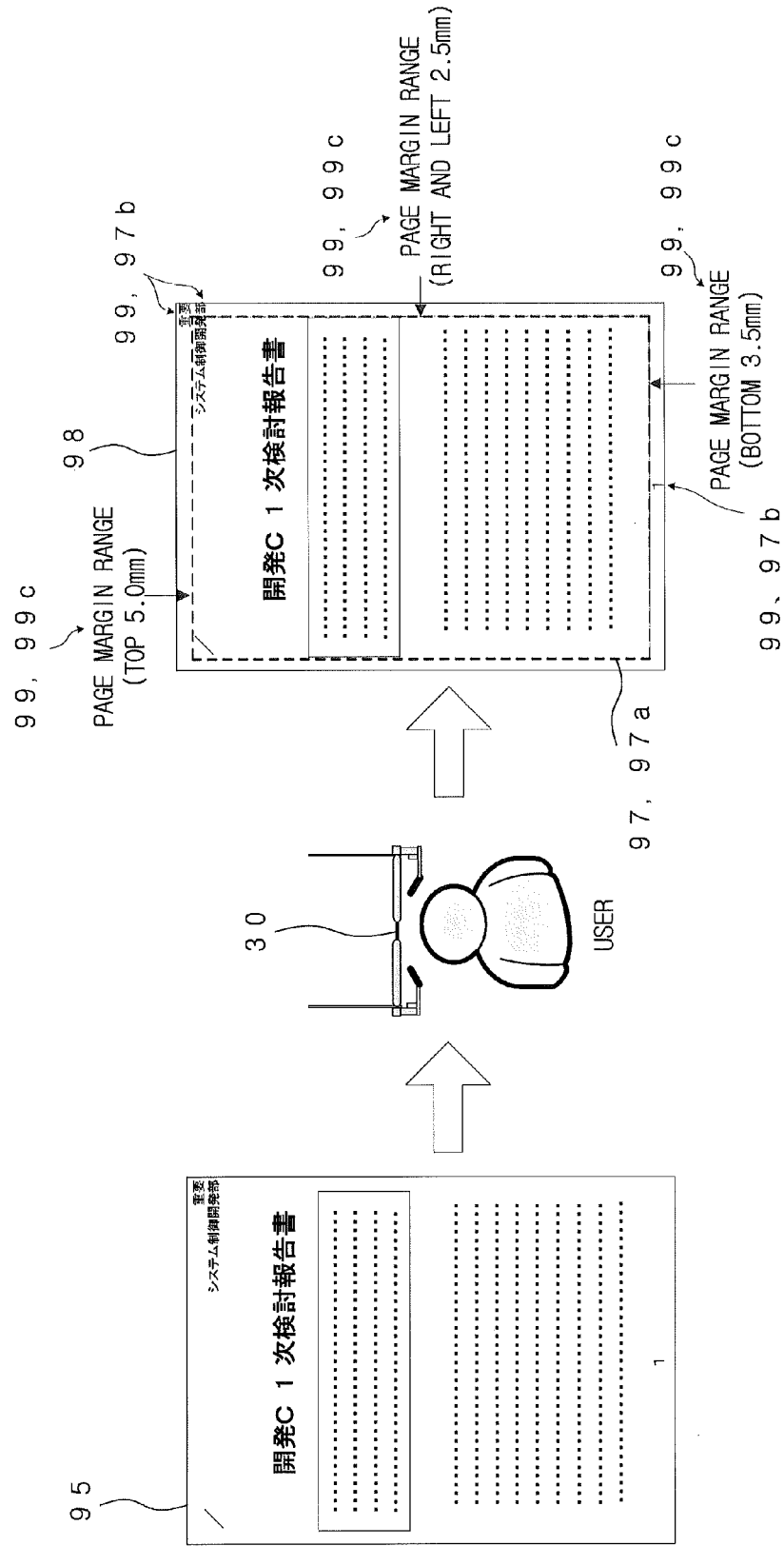
FIG. 12 is a view showing another example of an actual sheet and a sheet which exists in the augmented reality space in which the output image corresponding to the output setting for the page margin range caused in the copy process is overlapped.

FIG. 12 shows another example of the original (the sheet before the output setting) 95 which is read by the image reading unit 23 in the copy function and the sheet 98 after the output setting in case that the output setting for the page margin range is carried out. The output image 99 relating to the page margin range includes page margin range information 99*c* indicating the page margin range by using the numerical value in addition to the border line 97 and the warning image 97*b* shown in FIG. 11.

Figure 13:
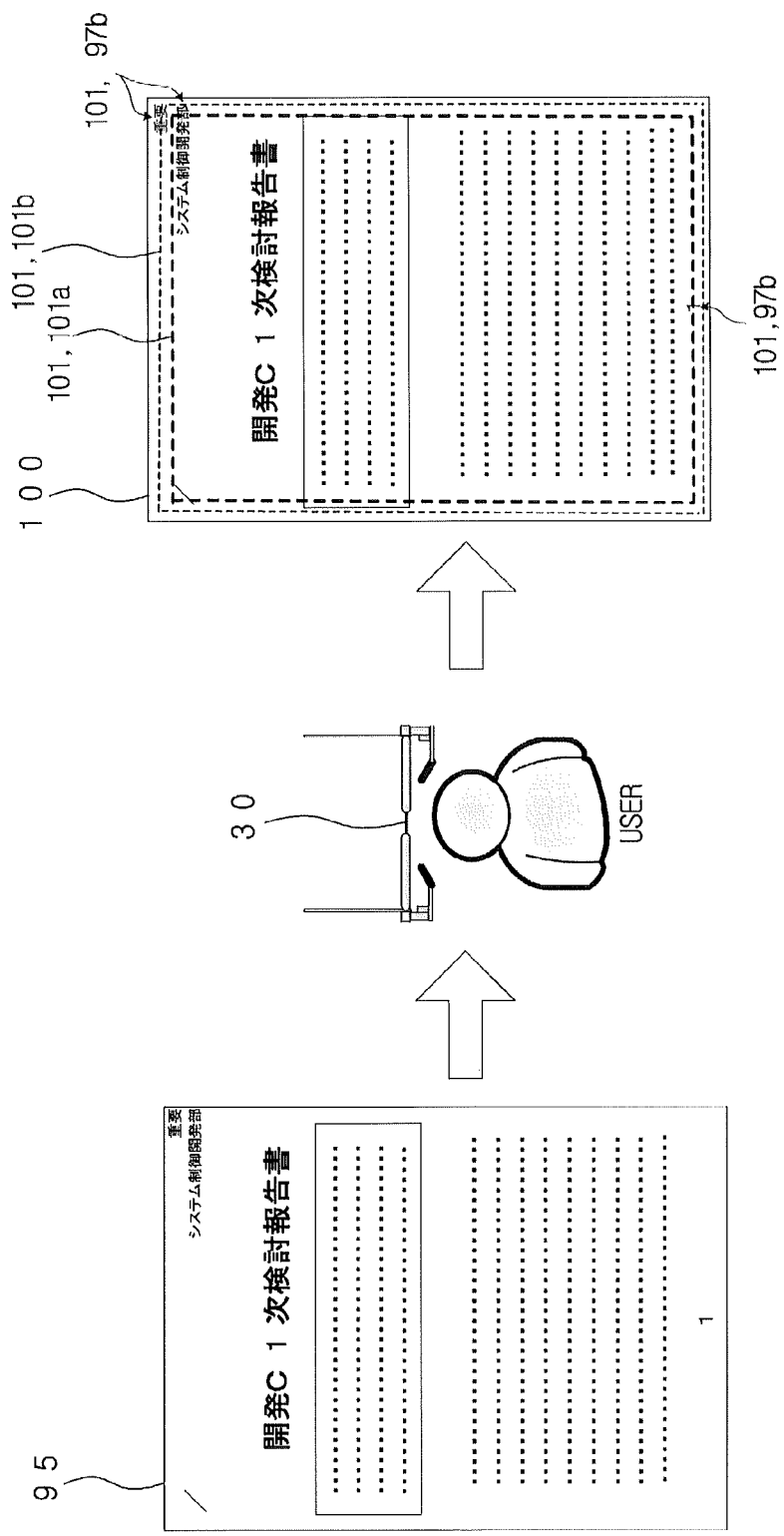
FIG. 13 is a view showing another example of an actual sheet and a sheet which exists in the augmented reality space in which the output image corresponding to the output setting for the page margin range caused in the copy process is overlapped.

FIG. 13 shows another example of the original (the sheet before the output setting) 95 which is read by the image reading unit 23 in the copy function and the sheet 100 after the output setting in case that the output setting for the page margin range is carried out. The output image 101 relating to the page margin range includes the first border line 101*a* indicating the outer perimeter of the recommended print area (for example, the area which is located 10 mm or more inward from the peripheral edge of the original), the second border line 101*b* indicating the outer perimeter of the printable area (the maximum area in which the image can be printed, for example, the area which is located 5 mm or more inward from the peripheral edge of the original) and the warning image 97*b* which is displayed as shown in FIG. 11. Both of the first border line 101*a* and the second border line 101*b* may be displayed. Alternatively, the first border line 101*a* and the second border line 101*b* may be displayed separately.

Figure 14:
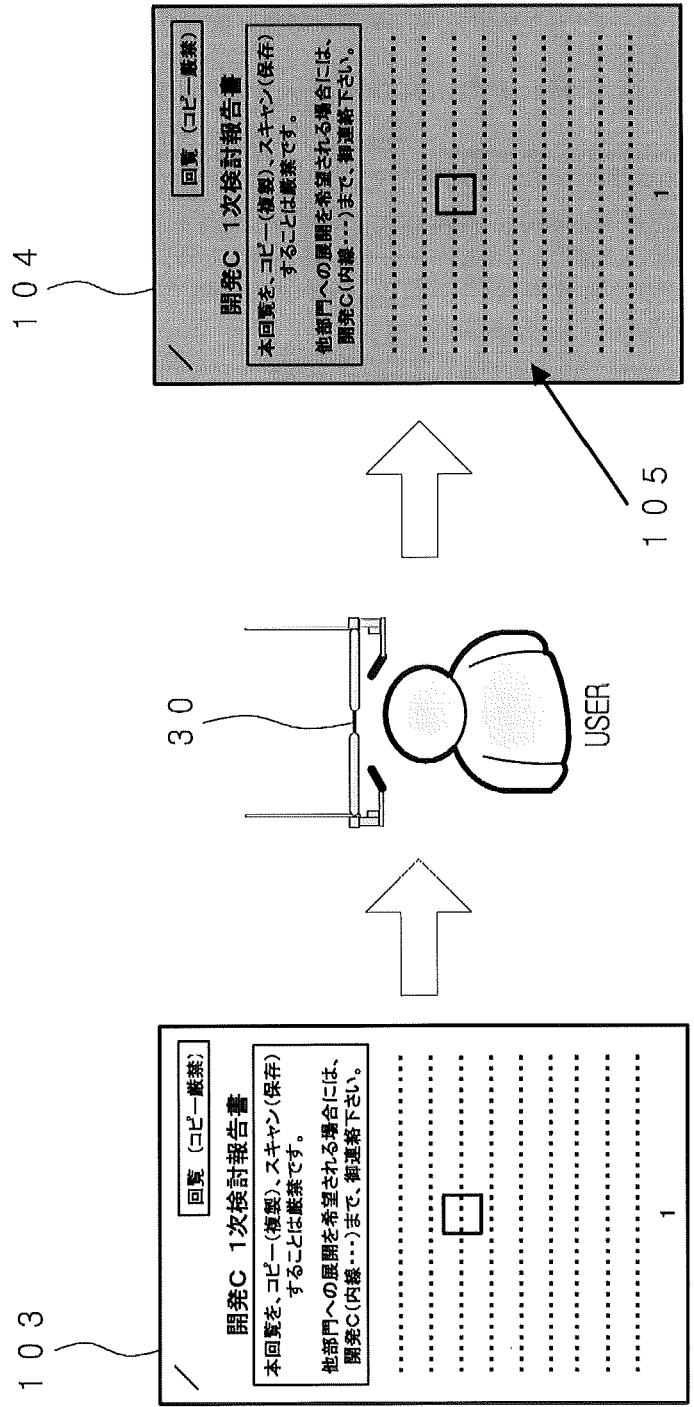
FIG. 14 is a view showing an actual sheet and a sheet which exists in the augmented reality space in which the output image corresponding to the output setting for the background pattern image is overlapped.

FIG. 14 shows the sheet 103 before the output setting and the sheet 104 after the output setting in case that the output setting for adding the background pattern image is carried out. In the output setting for adding the background pattern image, the pattern of the background pattern image, the character and/or the image to be embedded and the embedding position thereof are set. In the sheet 104 after the output setting, the output image 105 corresponding to the background pattern image (in the drawing, the gray background) is overlapped with the sheet 103 before the output image. Therefore, the user who wears the head-mounted display device 30 can previously confirm the contrast between the contents (characters and/or an image) which have been already printed on the sheet 103 before the output setting and the background pattern image to be added in accordance with the output setting, and the like, by viewing the sheet 104 after the output setting, which is displayed by carrying out the AR display in the head-mounted display device 30.

Figure 15:
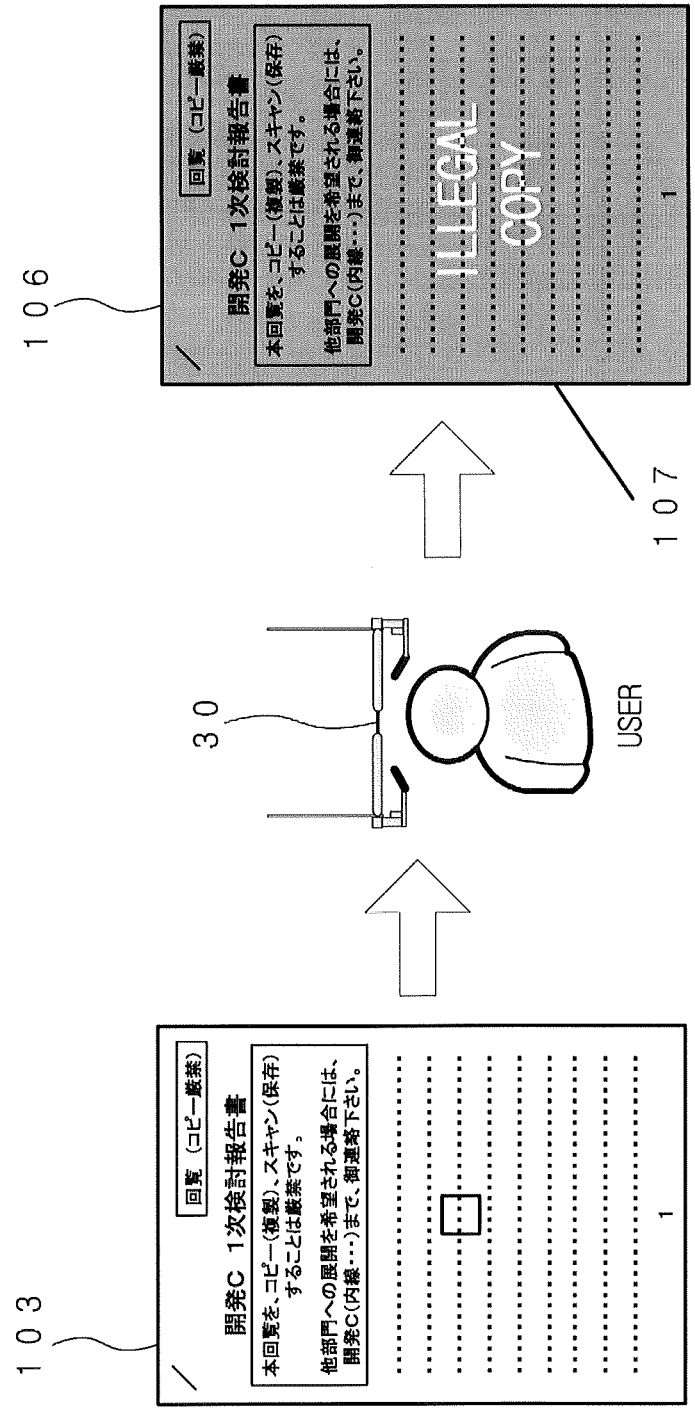
FIG. 15 is a view showing another example of an actual sheet and a sheet which exists in the augmented reality space in which the output image corresponding to the background pattern image in which a latent image is visualized, is overlapped.

FIG. 15 shows the sheet 103 before the output setting and the sheet 106 after the output setting, which corresponds to the output object obtained in case that the output object in which the background pattern image is added to the sheet 103 before the output setting is read by using the scanner to copy the output object. The output image 107 which is shown in the sheet 106 after the output setting is the background pattern image in which the embedded part (the character and/or the image which are embedded in the background pattern image) is visualized as the outline character and the like. FIG. 15 shows an example in which the characters embedded in the background pattern image are the term "ILLEGAL COPY".

Because in the sheet 106 after the output setting, the character and/or the image embedded as the latent image in the background pattern image are visualized, the user who wears the head-mounted display device 30 can previously confirm the positional relation between the contents (characters and/or an image) which have been already printed on the sheet 103 before the output setting and the latent image embedded in the background pattern image, and the density of the background (before the scanning and after the scanning), by viewing the sheet 106 after the output setting, which is displayed by carrying out the AR display in the head-mounted display device 30.

FIG. 16 shows the sheet 110 before the output setting and the sheet 111 after the output setting in case that the output setting for the center erase is carried out. In the sheet 111 after the output setting, the output image 112 indicating that the black copy mark caused along the center line of the sheet 110 is erased (is masked with white or the color of the sheet) is overlapped with the sheet 110 before the output setting. In the drawing, in order to improve the visibility of the output image 112 indicating that the black copy mask is masked with white, the sheet 111 after the output setting is shown in gray.

The user who wears the head-mounted display device 30 can previously confirm the processing result to be obtained in case that the center erase process is carried out for the sheet 110 before the output setting, by viewing the sheet 111 after the output setting, which is displayed by carrying out the AR display in the head-mounted display device 30. For example, it is possible to confirm whether the characters which are printed around the center of the original are not copied by the center erase process.

FIG. 17 shows the sheet 113 before the output setting and the sheet 114 after the output setting in case that the output setting for the frame erase process is carried out. In the sheet 114 after the output setting, the output image 115 indicating that the peripheral portion of the original is masked with white to erase the frame is overlapped with the sheet 113 before the output image. In the drawing, in order to improve the visibility of the output image 115 indicating that the frame is masked with white, the background is shown in gray. The user who wears the head-mounted display device 30 can previously confirm the processing result to be obtained in case that the frame erase process is carried out for the sheet 113 before the output setting, by viewing the sheet 114 after the output setting, which is displayed by carrying out the AR display in the head-mounted display device 30. For example, it is possible to confirm whether the characters which are printed in the edge portion of the original are not copied by the frame erase process.

Figure 18:
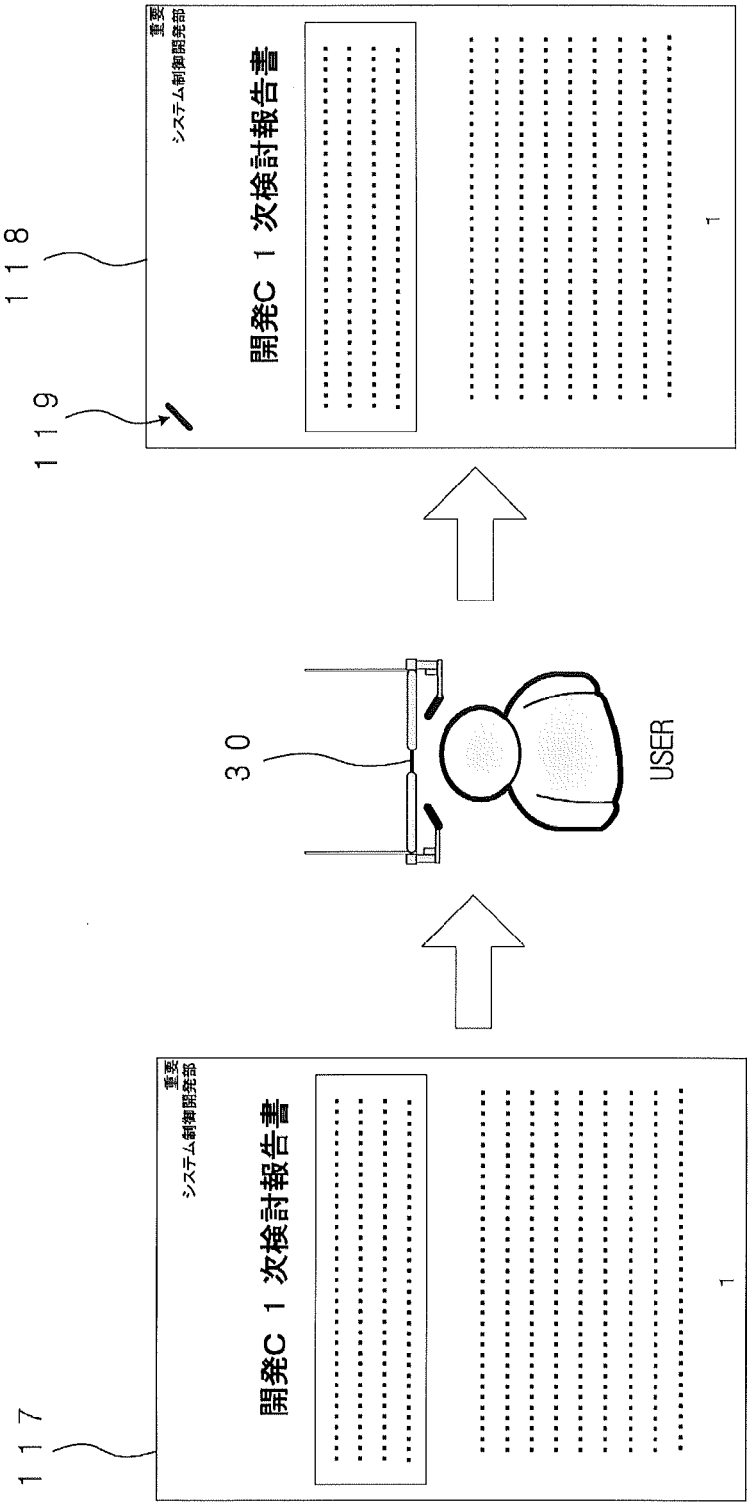
FIG. 18 is a view showing an actual sheet and a sheet which exists in the augmented reality space in which the output image corresponding to the output setting for the staple is overlapped.

FIG. 18 shows the sheet 117 before the output setting and the sheet 118 after the output setting in case that the output setting for stapling the sheets is carried out. In the sheet 118 after the output setting, the output image 119 corresponding to the staple is overlapped near the upper-left corner of the sheet 117 before the output setting. Therefore, the user who wears the head-mounted display device 30 can previously confirm the positional relation between the contents (characters and/or an image) which have been already printed on the sheet 117 before the output setting and the staple which is carried out in accordance with the output setting, by viewing the sheet 118 after the output setting, which is displayed by carrying out the AR display in the head-mounted display device 30.

Figure 19:
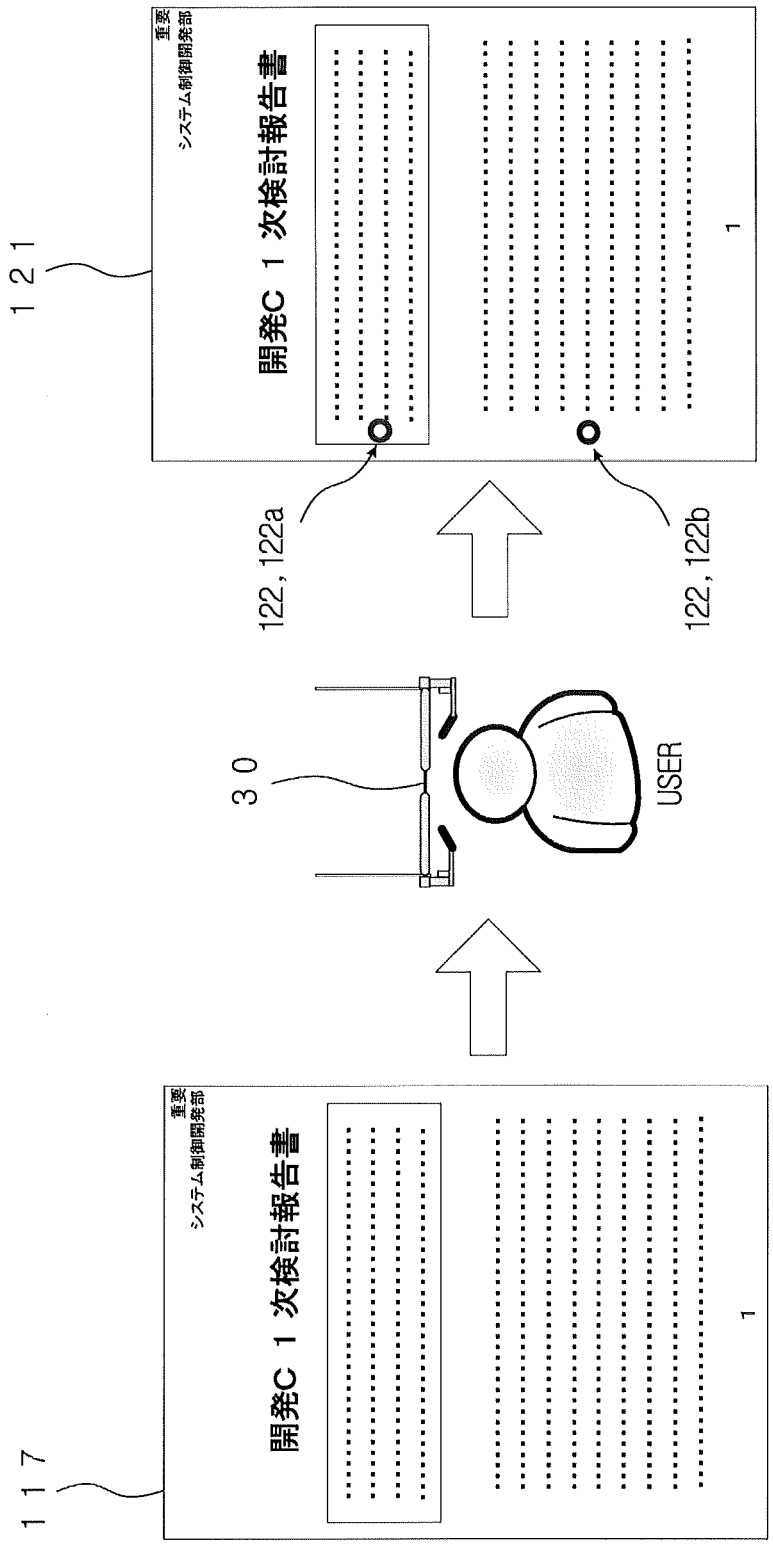
FIG. 19 is a view showing an actual sheet and a sheet which exists in the augmented reality space in which the output image corresponding to the output setting for the punching is overlapped.

FIG. 19 shows the sheet 117 before the output setting and the sheet 121 after the output setting in case that the output setting for punching the sheet is carried out. In the sheet 121 after the output setting, the output image 122 corresponding to two punch holes is overlapped at the left edge of the sheet 117 before the output setting. Therefore, the user who wears the head-mounted display device 30 can previously confirm the positional relation between the contents (characters and/or an image) which have been already printed on the sheet 117 before the output setting and the punch holes which are opened in accordance with the output setting, by viewing the sheet 121 after the output setting, which is displayed by carrying out the AR display in the head-mounted display device 30.

In the example of FIG. 19, the output image 122a corresponding to the first punch hole is overlapped with the printed area. On the other hand, the output image 122b corresponding to the second punch hole is not overlapped with the printed area. Therefore, the output image 122a corresponding to the first punch hole is indicated in red and the output image 122b corresponding to the second punch hole is indicated in blue. The display form of the output image 122a is differentiated from that of the output image 122b.

Next, the process which is carried out by the head-mounted display device 30 as the AR display device will be explained by using the flowchart. Because the portable terminal 60 which is the AR display device carries out the same process, the explanation thereof is omitted.

Figure 20:
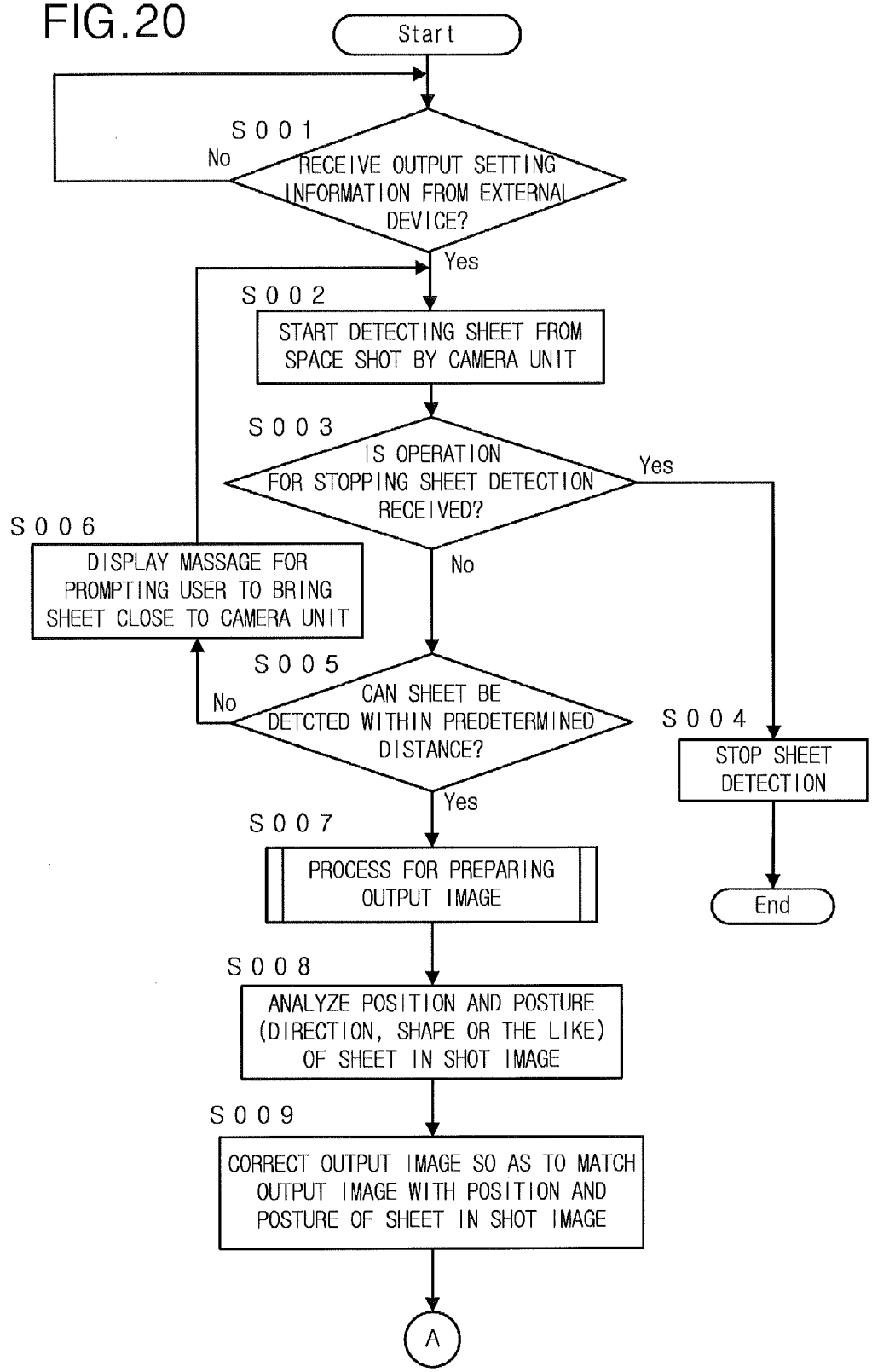
FIGS. 20 and 21 are a flowchart showing the whole process which is carried out by the head-mounted display device.
Figure 21:
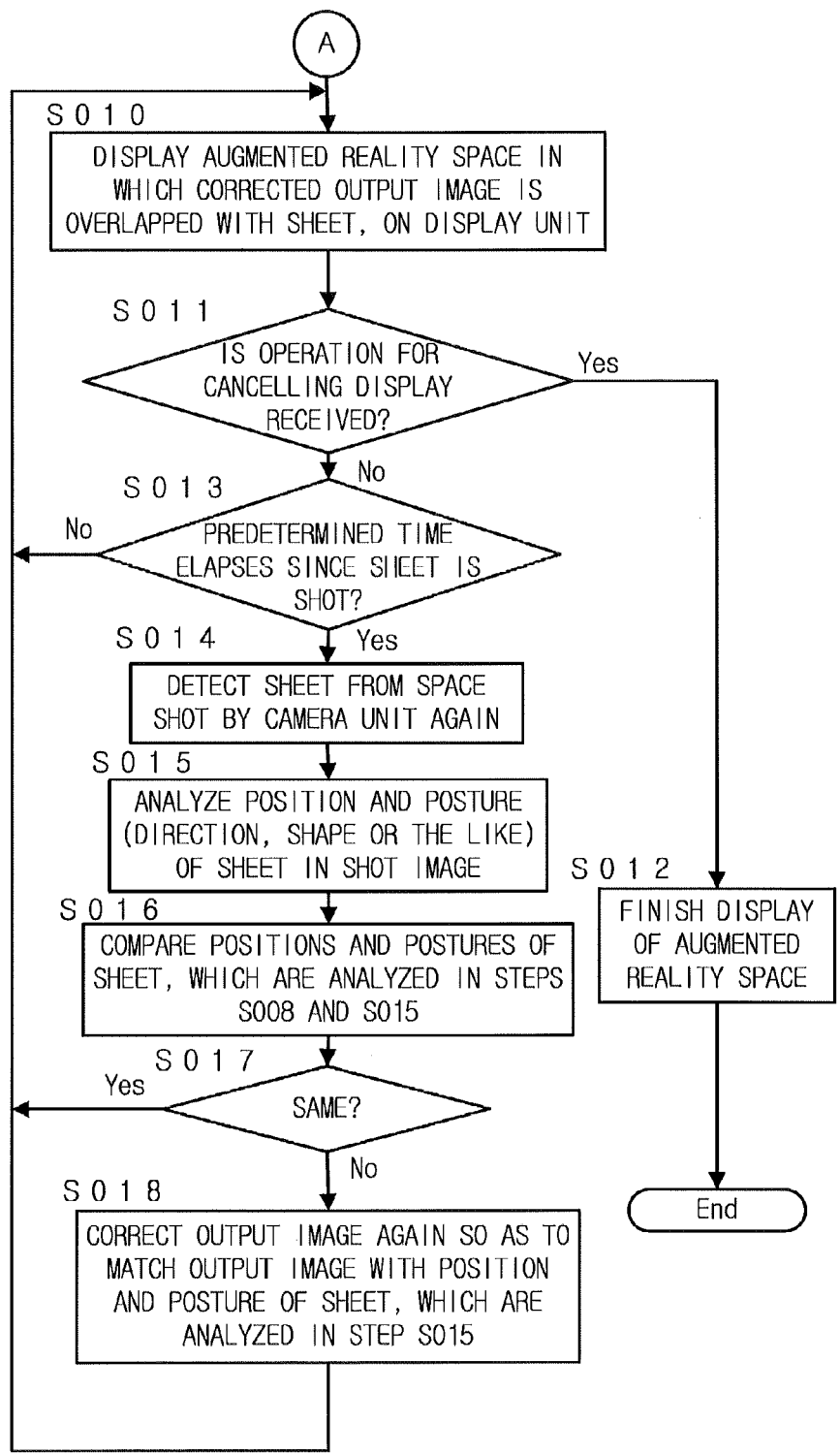

FIGS. 20 and 21 are the flowchart showing the whole process which is carried out by the head-mounted display device 30. The head-mounted display device 30 receives the output setting information indicating the contents of the output setting for the image forming apparatus 10 from an external device (for example, the image forming apparatus 10) (Step S001). In addition to the output setting which is actually set to the image forming apparatus 10, the output setting information relating to the output setting to be set in the future may be received from a portable terminal or the like.

When the head-mounted display device 30 receives the output setting information (Step S001; Yes), the detecting process for detecting the sheet related to the output setting from the reality space which is shot by the camera unit 47 is started (Step S002). Specifically, the head-mounted display device 30 detects the sheet by analyzing the shot image obtained by the camera unit 47, and measures the distance to the detected sheet by using the distance sensor 54.

In case that the instruction for stopping the detecting process is received from the user (Step S003; Yes), the head-mounted display device 30 instructs the camera unit 47 to stop obtaining the shot image and stops the detecting process (Step S004). Then, the process is ended.

In case that the instruction for stopping the detecting process is not received from the user (Step S003; No), the head-mounted display device 30 judges whether the sheet can be detected within the predetermined distance by the detecting process (Step S005). In this embodiment, the size of the actual sheet is calculated in accordance with the distance to the sheet and the size of the image of the sheet which exists in the shot image. By comparing the calculated size of the actual sheet with the standard sheet sizes registered in the management table (See FIG. 22) which is previously stored in the nonvolatile memory 44, the size of the actual sheet is specified. Then, in case that the specified size of the actual sheet matches the size of the sheet to be processed in accordance with the output setting information, the head-mounted display device 30 judges that the sheet related to the output setting information is detected.

In case that the sheet cannot be detected (Step S005; No), the head-mounted display device 30 instructs the display unit 31 to display the message "Because the sheet cannot be detected within the current shooting range, please bring the sheet close to the camera unit 47 so as to detect the sheet." (Step S006). Then, the process is continued by returning to Step S002.

In case that the sheet can be detected (Step S005; Yes), the head-mounted display device 30 prepares the output image which simulatedly shows the processing result to be obtained when the image forming apparatus 10 carries out the additional processing in accordance with the output setting defined in the output setting information received in Step S001 (Step S007).

Next, the head-mounted display device 30 analyzes the position and the posture of the detected sheet (the direction in which the camera unit 47 directs and the three-dimension shape) (Step S008). Then, the head-mounted display device 30 corrects the output image so as to match the output image with the position and the posture of the sheet, which are analyzed in Step S008 (Step S009).

Next, the head-mounted display device 30 carries out the AR display by overlapping the output image corrected in Step S009 or Step S018 with the sheet detected in Step S005 (Step S010). Therefore, the user who wears the head-mounted display device 30 views the augmented reality space in which the output image is overlapped with the sheet.

In case that the instruction for cancelling the AR display is received from the user (Step S011; Yes), the display unit 31 is cleared (Step S012). Then, the process is ended.

In case that the instruction for cancelling the AR display is not received (Step S011; No), the head-mounted display device 30 checks whether the predetermined time elapses since the sheet is shot (Step S013). The predetermined time is, for example, 0.1 second, and can be optionally set. Preferably, the predetermined time is the time period in which the output image can be displayed according to the movement of the sheet, and is not more than 0.2 second. More preferably, the predetermined time is not more than 0.1 second. In case that the processing speed is sufficient, it is desirable that the predetermined time is more shortened.

When the predetermined time elapses (Step S013; Yes), the detecting process for detecting the sheet from the reality space which is shot by the camera unit 47 again (Step S014). Then, the head-mounted display device 30 analyzes the position and the posture of the detected sheet (the direction in which the camera unit 47 directs and the three-dimension shape) (Step S015), and compares the position and the posture of the sheet, which are indicated by the previous analysis result, with the position and the posture of the sheet, which are indicated by the current analysis result (Step S016).

From the above comparison, in case that the position and the posture of the sheet, which are indicated by the previous analysis result, are the same as the posture of the sheet, which are indicated by the current analysis result (Step S017; Yes), the process is continued by returning to Step S010.

From the above comparison, in case that the position and the posture of the sheet, which are indicated by the previous analysis result, are different from the posture of the sheet, which are indicated by the current analysis result (Step S017; No), the head-mounted display device 30 corrects the output image so as to match the output image with the position and the posture of the sheet, which are indicated by the updated analysis result (the analysis result obtained in Step S015) (Step S018). Then, the process is continued by returning to Step S010.

Therefore, even when the user holds the sheet with the user's hand and the sheet is moved and deformed, the output image is displayed according to the movement and the deformation of the sheet so as to overlap the output image with the sheet.

Figure 23:
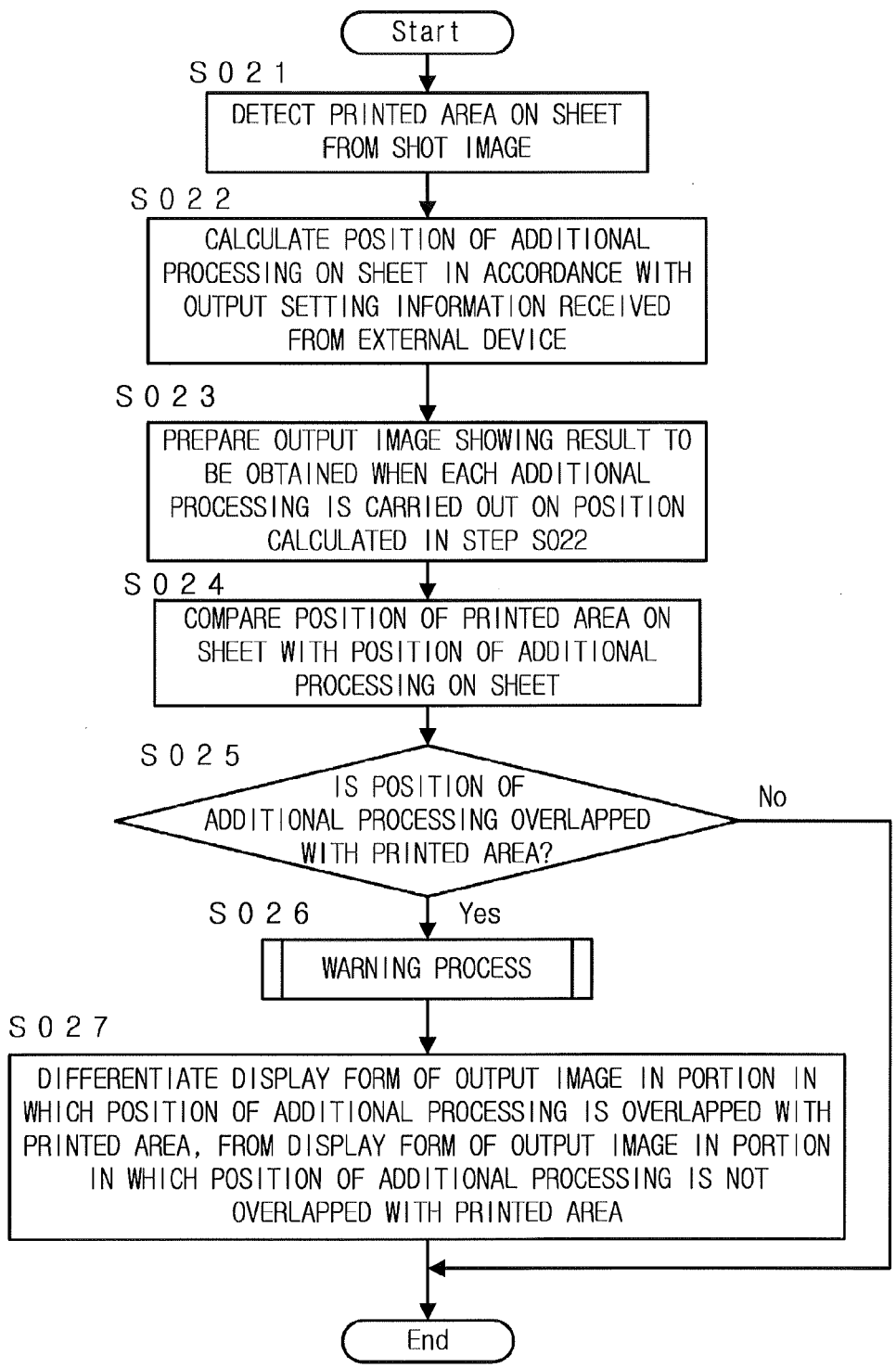
FIG. 23 is a flowchart showing the process for preparing the output image.

FIG. 23 shows the detail of Step S007 shown in FIG. 20. The CPU 41 of the head-mounted display device 30 analyzes the sheet which exists in the shot image obtained by the camera unit 47, and judges the printed area on the sheet (Step S021). Based on the output setting information received from an external device in Step S001, the CPU 41 calculates the position of the processing result on the sheet, which is obtained in case that the additional processing is carried out in accordance with the output setting defined in the output setting information (Step S022). For example, in case that the output setting for punching the sheet is carried out, the position of the punch holes on the sheet is calculated.

Next, the head-mounted display device 30 prepares the output image showing the processing result to be obtained when each additional processing is carried out on the position calculated in Step S022 in accordance with the output setting defined the output setting information (Step S023).

Next, the head-mounted display device 30 compares the position of the printed area on the sheet with the position calculated in Step S022, on which the additional processing is carried out (Step S024), and judges whether the position of the additional processing is overlapped with the printed area (Step S025). In case that the position of the additional processing is overlapped with the printed area (Step S025; Yes), the head-mounted display device 30 carries out the warning indicating the position of the additional processing is overlapped with the printed area (Step S026). As described above, the head-mounted display device 30 (AR display device) comprises the warning unit 57 for carrying out the warning indicating the processing result is overlapped with the printed area, for the user. Further, the head-mounted display device 30 differentiates the display form of the output image in the portion in which the position of the additional processing is overlapped with the printed area from the display form of the output image in the portion in which the position of the additional processing is not overlapped with the printed area (Step S027). Then, the process is ended. For example, the colors of the output images are different from each other, or one of the output images is shaded.

In case that the position of the additional processing is not overlapped with the printed area (Step S025; No), the output image prepared in Step S023 is treated as the final output image. Then, the process is ended.

Figure 24:
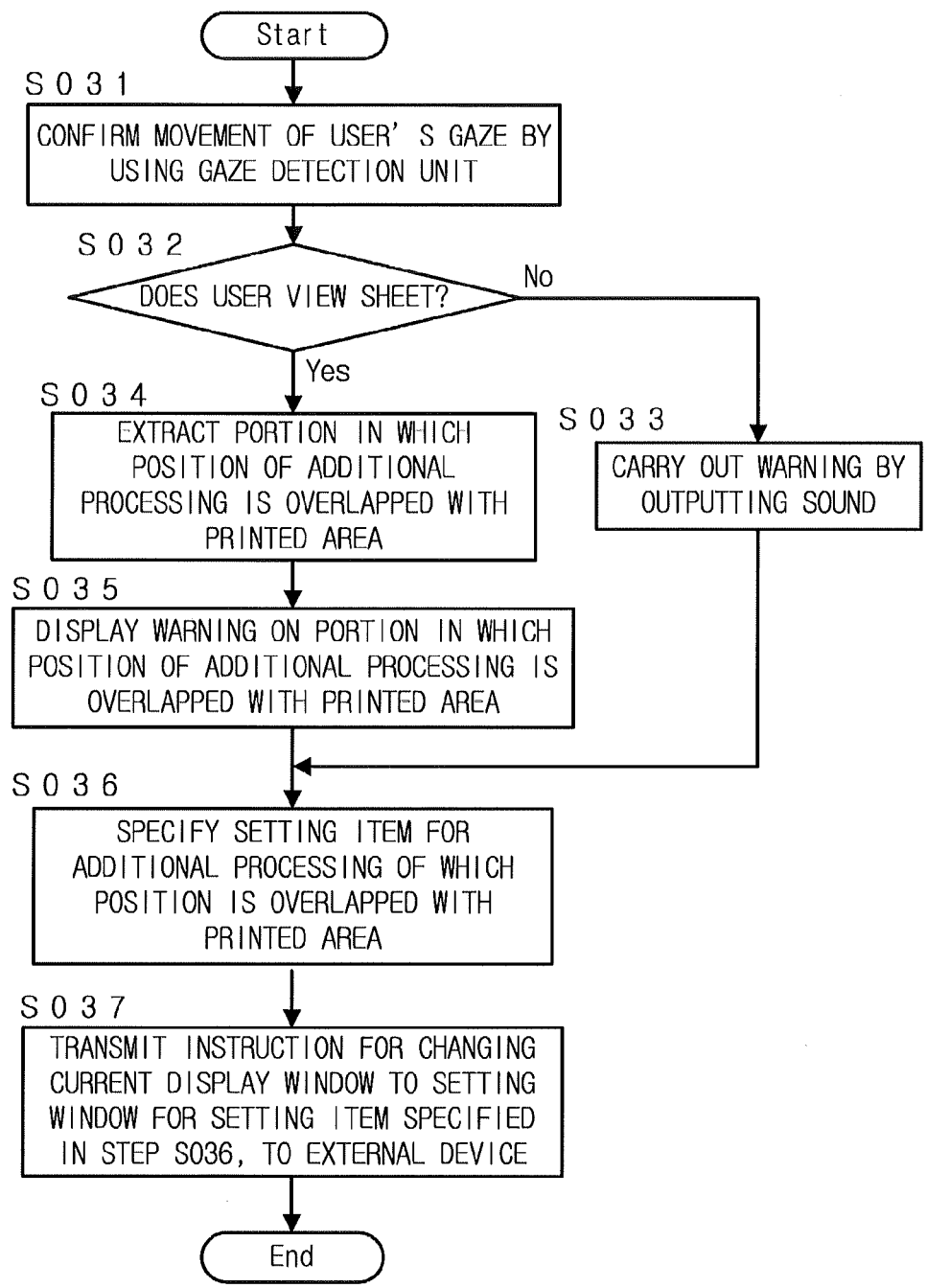
FIG. 24 is a flowchart showing the process for carrying out the warning relating to the overlap.

FIG. 24 shows the detail of Step S026 shown in FIG. 23. The head-mounted display device 30 confirms the movement of the user's gaze by using the gaze detection unit. 53 (Step S031). Then, the head-mounted display device 30 judges whether the user's gaze directs to the sheet (the user views the sheet) (Step S032). In case that the user does not view the sheet (Step S032; No), the warning is carried out by outputting the warning message indicating that the position of the additional processing is overlapped with the printed area, as a sound from the sound outputting unit 55 (Step S033). Then, the process proceeds to Step S036.

In case that the user views the sheet (Step S032; Yes), the portion in which the position of the additional processing is overlapped with the printed area, is extracted (Step S034). The warning, such as the message indicating that the position of the additional processing is overlapped with the printed area and the like, is displayed on the above portion or near the above portion (Step S035). Then, the process proceeds to the Step S036.

In Step S036, the additional processing of which the position is overlapped with the printed area (the setting item of the output setting) is specified. Then, the head-mounted display device 30 transmits the instruction for changing the current display window of the external device (for example, the image forming apparatus 10) to the setting window for the setting item specified in Step S036, to the external device (Step S037). That is, the head-mounted display device 30 (AR display device) comprises the setting change instruction unit 58 for instructing the external device to receive the changing operation for changing the setting contents relating to the additional processing from the user in case that the processing result relating to the additional processing is overlapped with the printed area. Then, the process is ended.

Figure 25:
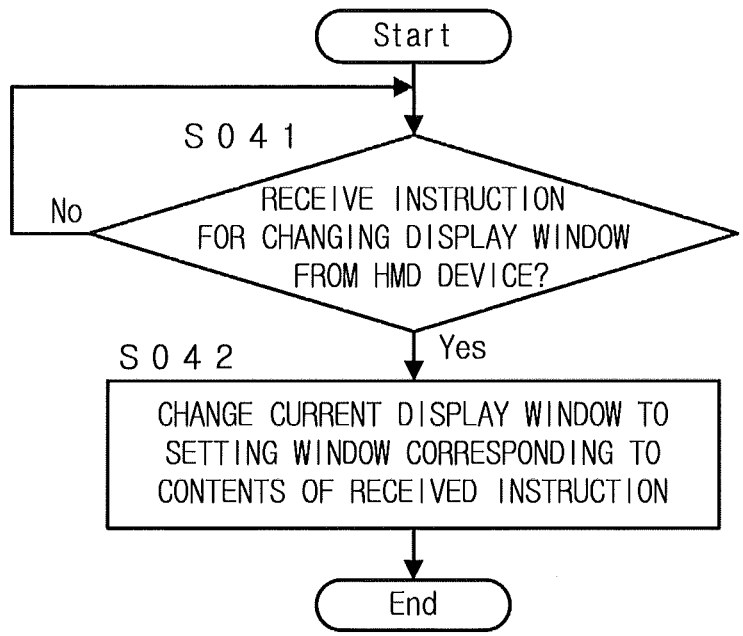
FIG. 25 is a flowchart showing the process which is carried out by the image forming apparatus to change the current window to the setting window which is designated by the head-mounted display device.

FIG. 25 shows the process which is carried out by the external device (the image forming apparatus 10 or the like) which receives the instruction transmitted from the head-mounted display device 30 in Step S037 of FIG. 24.

The external device, such as the image forming apparatus 10, waits for the above instruction for changing the display window, from the head-mounted display device 30 (Step S041; No). When the external device receives the instruction for changing the display window (Step S041; Yes), the external device changes the window displayed on its own operation panel to the setting window corresponding to the contents of the received instruction (Step S042). Then, the process is ended. Subsequently, the external device receives the resetting of the output setting or the change in the output setting via the changed setting window.

As described above, in the AR display device according to the embodiment (the head-mounted display device 30 and/or the portable terminal 60), the output setting information indicating the contents of the output setting for the image forming apparatus 10 is obtained from the image forming apparatus 10 or the like. The output image which simulatedly shows the processing result to be obtained in case that the image forming apparatus 10 carries out the additional processing defined in the output setting information is prepared. Further, the augmented reality space in which the prepared output image is overlapped with the sheet which exists in the reality space is displayed. Therefore, the user can previously confirm the processing result corresponding to the output setting without actually printing the document.

Further, because it is possible to confirm the processing result corresponding to the output setting by using the AR display in which the output image is overlapped with the sheet which exists in the reality space, for example, the troublesome task for reading an original by using a scanner is not required. Therefore, the user can easily and quickly confirm the processing result corresponding to the output setting.

Even though the user moves the sheet, the output image displayed in the augmented reality space is changed according to the movement of the sheet. Therefore, it is not necessary to fix the sheet. Further, by intentionally moving the sheet, it is possible to confirm the finish state from various directions.

Because the augmented reality space in which the output image is overlapped with the actual sheet is displayed, it is possible to confirm the positional relation and the overlapping state between the characters and/or the image which have been already printed on the actual sheet and the processing result of the additional processing corresponding to the output setting.

Further, because the output image is displayed so as to differentiate the display form of the output image in the portion in which the processing result of the additional processing corresponding to the output setting is overlapped with the characters and/or the image which have already printed on the sheet (the printed area) from the display form of the output image in the portion in which the processing result is not overlapped with the printed area, the user can easily confirm whether the processing result is overlapped with the printed area.

Further, each of the head-mounted display device 30 and the portable terminal 60 instructs the external device, such as the image forming apparatus 10, to display the setting window for changing the setting relating to the additional processing in which the processing result is overlapped with the printed area. Therefore, the user can easily change the unsuitable setting.

In the above examples, the head-mounted display device 30 and/or the portable terminal 60 carries out the process for preparing and correcting the output image and the process for overlapping the output image with the sheet. However, the AR display control device 130 (See FIG. 1) which is separated from the head-mounted display device 30 or the portable terminal 60, may carry out the process for preparing and correcting the output image and the process for determining the position of the output image so as to overlap the output image with the sheet, and the head-mounted display device 30 and/or the portable terminal 60 may display the augmented reality space including the output image in accordance with the instruction from the AR display control device 130.

Figure 26:
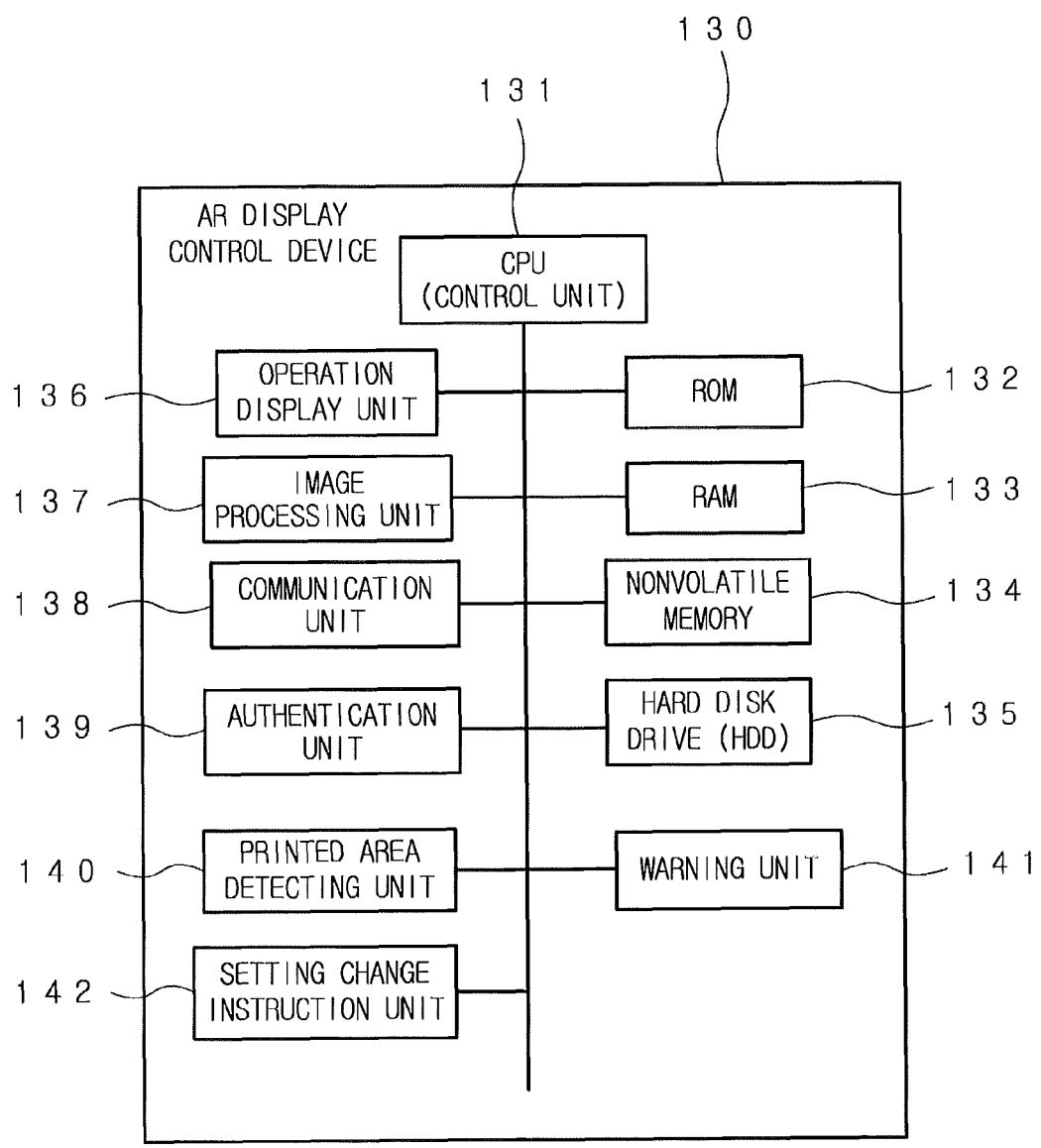
FIG. 26 is a block diagram showing the schematic configuration of the AR display control device.

FIG. 26 is the block diagram showing the schematic configuration of the AR display control device 130. The AR display control device 130 comprises a CPU 131 for controlling the whole operation of the AR display control device 130. The CPU 131 is connected to a ROM 132, a RAM 133, a nonvolatile memory 134, a hard disk drive 135, an operation display unit 136, an image processing unit 137, a communication unit 138, an authentication unit 139, a printed area detecting unit 140, a warning unit 141, a setting change instruction unit 142 and the like via a bus. By executing the programs stored in the ROM 132 by the CPU 131, the functions of the AR display control device 130 are realized.

The process contents setting device 130 obtains the output setting information via the communication unit 138 from the image forming apparatus 10 or the like. That is, the communication unit 138 functions as the setting information obtaining unit for obtaining the setting contents relating to the additional processing to be carried out for the image or the output sheet by the image forming apparatus 10 or the like. Further, the AR display control device 130 obtains the shot image obtained by the camera and the distance information detected by the distance sensor from the AR display device, such as the head-mounted display device, the portable terminal 60 or the like, and detects the sheet which exists in the reality space which is shot by the camera of the AR display device and the posture of the sheet. That is, the CPU 131 functions as the detecting unit for detecting the sheet in the reality space by analyzing the video or the like, which is obtained by the camera of the AR display device. Then, the CPU 131 prepares the output image which simulatedly shows the processing result to be obtained when the image forming apparatus 10 or the like carries out the additional processing in accordance with the output setting information (the setting contents) obtained from the image forming apparatus 10 or the like, and corrects the output image according to the posture of the sheet which exists in the reality space. Further, the AR display control device 130 instructs the AR display device to display the augmented reality space in which the corrected output image is overlapped with the sheet which exists in the reality space. For example, the AR display control device 130 prepares the corrected output image and the information indicating the position on which the output image is overlapped, to transmit the prepared output image and the like to the head-mounted display device 30. Further, the AR display control device instructs the head-mounted display device 30 to display the above augmented reality space by carrying out the AR display. That is, the CPU 131 functions as the display control unit.

Further, the printed area detecting unit 140, the warning unit 141, the setting change instruction unit 142 have the same functions as the printed area detecting unit 56, the warning unit 57, the setting change instruction unit 58 of the head-mounted display device 30, respectively. Further, the communication unit 138 functions as the gaze information obtaining unit for obtaining the gaze information indicating what the user views, from the AR display device or the like. Further, the warning unit 141 judges whether the user views the sheet in accordance with the gaze information when the warning is carried out. Further, in case that the user views the sheet, the warning unit 141 instructs the display unit of the AR display device to display the warning. In case that the user does not view the sheet, the warning unit 141 carries out the warning as the sound by using the sound output sound of the AR display device or the like.

The AR display control device 130 is configured as the portable terminal as shown in FIG. 1 or may be configured by a PC, a server or the like.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

Each additional processing shown in the embodiment is illustrative only. An optional processing which is carried out by the image forming apparatus 10 and in which the processing result is obtained in an object to be output, can be adopted as the additional processing.

In this embodiment, the position and the posture of the sheet is detected by analyzing the shot image obtained by the camera unit 47 and by measuring the distance to each portion with the distance sensor 54. However, the method for detecting the position and the posture of the sheet is not limited to this.

In the present invention, the print condition setting system which does not include a printing apparatus may be configured. That is, the print condition setting system may comprise the device (for example, a portable terminal) for carrying out the output setting relating to the additional processing which is carried out by an external printing apparatus, and the AR display device or the AR display control device.

The sheet before the output setting, which is shown in the embodiment, may be an original to be copied, or an output object which is printed in accordance with the print data. In case of the original to be copied, by using the head-mounted display device 30 and/or the portable terminal 60 according to the embodiment, the user can confirm the finish state corresponding to the output setting by carrying out the AR display before the original is copied. In case of the print data, before the printing is carried out in accordance with the print data, it is possible to confirm the processing result to be obtained in case that the additional processing corresponding to the output setting is carried out, by carrying out the AR display.

The method for differentiating the display form of the output image in the portion in which the processing result of the additional processing is overlapped with the printed area and the display form of the output image in the portion in which the processing result is not overlapped with the printed area, is not limited to the case in which the colors of the output images are differentiated. The output image may be displayed so as to differentiate an optional attribute of the output image, such as the shape, the thickness, the size of the output image or the like.

In this embodiment, the head-mounted display device 30 in which the image is overlapped with the outside scene by using the half mirrors 35, is used. However, a VR (Virtual Reality) type of head-mounted display may be used. In the VR type of head-mounted display, when the user wears the head-mounted display, the user cannot look at the outside scene and can look at only the projected image. In this case, like the portable terminal 60, the image obtained by combining the output image with the camera image may be displayed.

One of the objects of the above embodiments is to provide an AR display device, an AR display control device, a print condition setting system, a print system, a print setting display method and a non-transitory computer-readable recording medium, which enable a user to easily confirm the finish state of the printed matter.

In this embodiment, the output image which simulatedly shows the processing result to be obtained in case that the printing apparatus carries out the additional processing in accordance with the setting contents obtained from an external device is prepared. The prepared output image is corrected so as to match the output image with the posture of the sheet which exists in the reality space. Then, the augmented reality space in which the corrected output image is overlapped with the sheet which exists in the reality space is displayed by carrying out the AR display. Therefore, the user can previously and easily confirm the processing result to be obtained in case that the printing apparatus carries out the additional processing in accordance with the setting contents.

In this embodiment, in case that the processing result relating to the predetermined additional processing among the additional processings defined in the setting contents is overlapped with the printed area in which the character or the image has been already printed on the sheet which exists in the reality space, the warning is carried out.

In this embodiment, in case that the user views the sheet, the warning is carried out by displaying the warning. In case that the user does not view the sheet, the warning is carried out by outputting a sound.

In this embodiment, the portion in which the processing result relating to the predetermined additional processing among the additional processings defined in the setting contents is overlapped with the printed area on the sheet which exists in the reality space is differentiated from the portion in which the processing result is not overlapped with the printed area. The output image is displayed by differentiating the display form of the output image in the portion in which the processing result is overlapped with the printed area from the display form of the output image in the portion in which the processing result is not overlapped with the printed area, for example, by changing the color of the output image.

In this embodiment, in case that the processing result relating to the predetermined additional processing among the additional processings defined in the setting contents is overlapped with the printed area, the external device which receives the setting relating to the additional processing from the user is instructed to receive the changing operation for changing the setting contents relating to the additional processing from the user. For example, the external device is instructed to display the relevant setting window.

According to the AR display device, the AR display control device, the print condition setting system, the print system, the print setting display method and the non-transitory computer-readable recording medium, the user can previously and easily confirm the finish state of the printed matter in the augmented reality space.

The present U.S. patent application claims the priority of Japanese Patent Application No. 2013-238312, filed on Nov. 18, 2013, according to the Paris Convention, and the entirety of which is incorporated herein by reference for correction of incorrect translation.

What is claimed is:

1. An AR display device, comprising:
    a display device configured to display an augmented reality space in which an image is overlapped with a reality space;
    a camera configured to shoot the reality space corresponding to the augmented reality space displayed by the display device;
    a processor configured to:
        obtain setting contents relating to a processing for an image or an output sheet to be carried out by a predetermined printing apparatus;
        detect an actual shape of a sheet in the reality space that is shot by the camera;
        prepare an output image which simulatedly shows a processing result obtained when the predetermined printing apparatus carries out the processing in accordance with the obtained setting contents;
        detect a difference in a shape of the sheet in the reality space by comparing the detected actual shape of the sheet with a specified actual shape of the sheet;
        correct the output image so that the output image matches with the detected difference in the shape of the sheet in the reality space; and
        instruct the display device to display the augmented reality space in which the corrected output image is overlapped with the sheet in the reality space.

2. The AR display device of claim 1, wherein the processor is further configured to:
    detect a printed area in which a character or an image has been already printed on the sheet which exists in the reality space, from a shot image obtained by the camera; and
    judge whether the processing result relating to the processing is overlapped with the printed area, and to carry out a predetermined warning in case that the processing result is overlapped with the printed area.

3. The AR display device of claim 2, wherein the processor is further configured to:
    detect a gaze of a user,
    wherein when the warning is carried out, the processor judges whether the user views the sheet in accordance with a detecting result obtained by the processor, and
    wherein in case that the user views the sheet, the processor instructs the display device to display the warning, and in case that the user does not view the sheet, the processor carries out the warning by outputting a sound.

4. The AR display device of claim 1, wherein the processor is further configured to:
    detect a printed area in which a character or an image has been already printed on the sheet which exists in the reality space, from a shot image obtained by the camera, wherein the processor judges whether the processing result relating to the processing is overlapped with the printed area, and differentiates a display form of the output image in a portion in which the processing result is overlapped with the printed area, from another display form of the output image in a portion in which the processing result is not overlapped with the printed area.

5. The AR display device of claim 1, wherein the processor is further configured to:
    detect a printed area in which a character or an image has been already printed on the sheet which exists in the reality space, from a shot image obtained by the camera; and
    judge whether the processing result relating to the processing is overlapped with the printed area, and to instruct an external device which receives a setting relating to the processing from a user, to receive a changing operation for changing the setting contents relating to the processing from the user in case that the processing result relating to the processing is overlapped with the printed area.

6. A print condition setting system, comprising:
    the AR display device of claim 5; and
    a setting device configured to receive the setting relating to the processing from the user, and to receive the changing operation for changing the setting contents relating to the processing from the user in accordance with an instruction from the processor in case that the processing result relating to the processing is overlapped with the printed area.

7. A print system, comprising:
    the AR display device of claim 5; and
    a printing apparatus comprising a setting unit configured to receive the setting relating to the processing from the user, and to receive the changing operation for changing the setting contents relating to the processing from the user in accordance with an instruction from the processor in case that the processing result relating to the processing is overlapped with the printed area.

8. A non-transitory computer-readable recording medium storing a program, wherein the program causes an information processing apparatus to function as the AR display device of claim 1.

9. The AR display device of claim 1, wherein the processor detects the difference in the shape of the sheet in the reality space in a three-dimension shape.

10. The AR display device of claim 1, wherein when the output image is corrected by the processor according to the detected difference in the shape of the sheet in the reality space, a shape of the output image, which is viewed by a user, is changed.

11. The AR display device of claim 1, wherein the processor is further configured to:
    compare the actual shape of the sheet in the reality space detected at a first timing, with the actual shape of the sheet in the reality space detected at a second timing, and
    when it is judged that the actual shape of the sheet in the reality space at the first timing is different from the actual shape of the sheet in the reality space at the second timing as a result of comparing the shapes, correct the output image, which is matched with the actual shape of the sheet in the reality space detected at the first timing, so that the output image matches with the actual shape of the sheet in the reality space detected at the second timing, and
    wherein the first timing is a timing which is different from the second timing.

12. The AR display device of claim 1, wherein the detected difference in the shape of the sheet in the reality space includes a change in the shape of the sheet in the reality space from a first situation to a second situation which is different from the first situation, and
  when it is judged that the shape of the sheet in the reality space is changed from the first situation to the second situation, the processor is further configured to correct the output image, which is matched with the shape of the sheet in the reality space in the first situation, so that the output image matches with the shape of the sheet in the reality space in the second situation.

13. The AR display device of claim 1, wherein the processor detects the actual shape of the sheet in the reality space in accordance with a size of the sheet in the reality space and a distance between the AR display device and the sheet.

14. An AR display control device for controlling display contents of an AR display device comprising:
  a display device configured to display an augmented reality space in which an image is overlapped with a reality space; and
  a camera configured to shoot the reality space corresponding to the augmented reality space displayed by the display device, the AR display control device comprising:
  a processor configured to:
    obtain setting contents relating to a processing for an image or an output sheet to be carried out by a predetermined printing apparatus;
    detect an actual shape of a sheet in the reality space that is shot by the camera;
    prepare an output image which simulatedly shows a processing result obtained when the predetermined printing apparatus carries out the processing in accordance with the obtained setting contents;
    detect a difference in a shape of the sheet in the reality space by comparing the detected actual shape of the sheet with a specified actual shape of the sheet;
    correct the output image so that the output image matches with the detected difference in the shape of the sheet in the reality space; and
    instruct the display device to display the augmented reality space in which the corrected output image is overlapped with the sheet in the reality space.

15. The AR display control device of claim 14, wherein the processor is further configured to:
  detect a printed area in which a character or an image has been already printed on the sheet which exists in the reality space, from a shot image obtained by the camera; and
  judge whether the processing result relating to the processing is overlapped with the printed area, and to carry out a predetermined warning in case that the processing result is overlapped with the printed area.

16. The AR display control device of claim 15, wherein the processor is further configured to:
  obtain gaze information indicating what a user views,
  wherein when the warning is carried out, the processor judges whether the user views the sheet in accordance with the gaze information, and
  wherein in case that the user views the sheet, the processor instructs the display device to display the warning, and in case that the user does not view the sheet, the processor carries out the warning by outputting a sound.

17. The AR display control device of claim 14, wherein the processor is further configured to:
  detect a printed area in which a character or an image has been already printed on the sheet which exists in the reality space, from a shot image obtained by the camera, wherein the processor judges whether the processing result relating to the processing is overlapped with the printed area, and differentiates a display form of the output image in a portion in which the processing result is overlapped with the printed area, from another display form of the output image in a portion in which the processing result is not overlapped with the printed area.

18. The AR display control device of claim 14, wherein the processor is further configured to:
  detect a printed area in which a character or an image has been already printed on the sheet which exists in the reality space, from a shot image obtained by the camera; and
  judge whether the processing result relating to the processing is overlapped with the printed area, and to instruct an external device which receives a setting relating to the processing from a user, to receive a changing operation for changing the setting contents relating to the processing from the user in case that the processing result relating to the processing is overlapped with the printed area.

19. A print condition setting system, comprising:
  the AR display control device of claim 18; and
  a setting device configured to receive the setting relating to the processing from the user, and to receive the changing operation for changing the setting contents relating to the processing from the user in accordance with an instruction from the processor in case that the processing result relating to the processing is overlapped with the printed area.

20. A print system, comprising:
  the AR display control device of claim 18; and
  a printing apparatus comprising a setting unit configured to receive the setting relating to the processing from the user, and to receive the changing operation for changing the setting contents relating to the processing from the user in accordance with an instruction from the processor in case that the processing result relating to the processing is overlapped with the printed area.

21. A non-transitory computer-readable recording medium storing a program, wherein the program causes an information processing apparatus to function as the AR display control device of claim 14.

22. A print setting display method for instructing an AR display device to display setting contents relating to a processing for an image or an output sheet to be carried out by a predetermined printing apparatus, the AR display device comprising:
  a display device configured to display an augmented reality space in which an image is overlapped with a reality space; and
  a camera configured to shoot the reality space corresponding to the augmented reality space displayed by the display device;
  the print setting display method comprising:
    obtaining the setting contents;
    detecting an actual shape of a sheet in the reality space that is shot by the camera;
    preparing an output image which simulatedly shows a processing result obtained when the predetermined printing apparatus carries out the processing in accordance with the obtained setting contents;
    detecting a difference in a shape of the sheet in the reality space by comparing the detected actual shape of the sheet with a specified actual shape of the sheet;
    correcting the output image so that the output image matches with the detected difference in the shape of the sheet in the reality space; and
    instructing the display device to display the augmented reality space in which the corrected output image is overlapped with the sheet in the reality space.

* * * * *